(12) United States Patent
Happel

(10) Patent No.: US 10,472,815 B1
(45) Date of Patent: Nov. 12, 2019

(54) HYDRO-VARIANT BAFFLE CARTRIDGE SYSTEM

(71) Applicant: Suntree Patent Holding, LLC, Cocoa, FL (US)

(72) Inventor: Tom Happel, Cocoa, FL (US)

(73) Assignee: Oldcastle Infrastructure, Inc., Auburn, WA (US)

( * ) Notice: Subject to any disclaimer, the term of this patent is extended or adjusted under 35 U.S.C. 154(b) by 7 days.

(21) Appl. No.: 15/948,011

(22) Filed: Apr. 9, 2018

Related U.S. Application Data

(63) Continuation-in-part of application No. 15/686,931, filed on Aug. 25, 2017, now Pat. No. 10,155,670, which is a continuation-in-part of application No. 15/658,864, filed on Jul. 25, 2017, which is a continuation-in-part of application No. 15/639,685, (Continued)

(51) Int. Cl.
| | | |
|---|---|---|
| *E03F 5/04* | (2006.01) | |
| *C02F 1/40* | (2006.01) | |
| *B01D 21/00* | (2006.01) | |
| *C02F 1/52* | (2006.01) | |
| *B01D 21/01* | (2006.01) | |

(Continued)

(52) U.S. Cl.
CPC ........ *E03F 5/0404* (2013.01); *B01D 21/0042* (2013.01); *B01D 21/01* (2013.01); *C02F 1/40* (2013.01); *C02F 1/52* (2013.01); *E03F 5/0402* (2013.01); *E03F 5/0403* (2013.01); *E03F 5/14* (2013.01); *C02F 2103/001* (2013.01)

(58) Field of Classification Search
CPC ..... E03F 5/0402; E03F 5/0403; E03F 5/0404; E03F 5/14; C02F 1/40; B01D 21/0042

USPC ............ 210/170.03, 305, 306, 747, 2, 747.3
See application file for complete search history.

(56) References Cited

U.S. PATENT DOCUMENTS

| | | |
|---|---|---|
| 122,209 A | 12/1871 | Ashman |
| 232,948 A | 10/1880 | Dernham |
| | (Continued) | |

FOREIGN PATENT DOCUMENTS

| | | |
|---|---|---|
| FR | 2916458 | * 11/2008 |
| JP | 2004353407 | 12/2004 |

OTHER PUBLICATIONS

Rising and Non-Rising Stem, Telescoping Valves, Halliday Products, retrieved on Jun. 15, 2009, retrieved from www.hallidayproducts.com/ssg.html, 4 pages.

(Continued)

*Primary Examiner* — Christopher Upton
(74) *Attorney, Agent, or Firm* — Brian S. Steinberger; Hilary F. Steinberger; Law Offices of Brian S. Steinberger, P.A.

(57) ABSTRACT

Stormwater pollution prevention systems, vaults, boxes, and methods of treatment systems to capture pollutants from storm water runoff and prevent the conveyance of these pollutants from entering a receiving water body or landscape area. The systems can be part of a local permanent storm water drainage infrastructure, where the system combines both drainage conveyance, multi-level treatment techniques, variable hydraulic capabilities, and easy and inexpensive methods for servicing the systems. The systems can use cartridges, each having either a treatment media or treatment polymer inside, wherein the cartridges can be serviced without requiring anyone to enter into a treatment vault/box.

20 Claims, 18 Drawing Sheets

Related U.S. Application Data filed on Jun. 30, 2017, now Pat. No. 10,202,285, which is a continuation-in-part of application No. 14/288,455, filed on May 28, 2014, now abandoned.

(60) Provisional application No. 62/506,188, filed on May 15, 2017, provisional application No. 61/828,958, filed on May 30, 2013.

(51) Int. Cl.
    *E03F 5/14*         (2006.01)
    *C02F 103/00*     (2006.01)

(56) References Cited

U.S. PATENT DOCUMENTS

| | | |
|---|---|---|
| 587,559 A | 8/1897 | Riley |
| 664,945 A | 1/1901 | Guion |
| 783,556 A | 2/1905 | Van Buskirk |
| 809,201 A | 1/1906 | Lutz |
| 920,961 A | 5/1909 | Keil |
| 1,060,338 A | 4/1913 | Gschwind |
| 2,102,310 A | 12/1937 | Egan |
| 2,182,795 A | 12/1939 | Day |
| 2,263,259 A | 11/1941 | Boosey |
| 2,360,961 A | 10/1944 | Mayo |
| 2,436,793 A | 3/1948 | Danel |
| 2,485,755 A | 10/1949 | Loosli |
| 2,559,784 A | 7/1951 | Moore |
| 2,615,526 A | 10/1952 | Lane |
| 2,652,946 A | 9/1953 | Beatty |
| 2,796,988 A | 6/1957 | Loffler |
| 3,091,339 A | 5/1963 | Marra et al. |
| 3,237,915 A | 3/1966 | Palmer et al. |
| 3,282,430 A | 11/1966 | Kinne |
| 3,527,348 A | 9/1970 | Lalonde et al. |
| 3,631,983 A | 1/1972 | Mail |
| 4,070,863 A | 1/1978 | Brown |
| 4,189,386 A | 2/1980 | Aman |
| 4,198,717 A | 4/1980 | Kessel |
| 4,278,190 A | 7/1981 | Oory et al. |
| 4,297,219 A | 10/1981 | Kirk et al. |
| 4,308,141 A | 12/1981 | Clendenen |
| 4,326,952 A | 4/1982 | Blake |
| 4,422,931 A | 12/1983 | Wolde-Michael |
| 4,509,717 A | 4/1985 | Wright et al. |
| 4,668,405 A | 5/1987 | Boze |
| 4,689,145 A | 8/1987 | Mathews et al. |
| 4,738,644 A | 4/1988 | Happel |
| 4,765,889 A | 8/1988 | Grujanac |
| 4,785,966 A | 11/1988 | Waltke |
| 4,895,653 A | 1/1990 | Cherochak |
| 5,034,122 A | 7/1991 | Wiesemann |
| 5,037,541 A | 8/1991 | Ruey-Jang et al. |
| 5,069,781 A | 12/1991 | Wilkes |
| 5,133,619 A | 7/1992 | Murfae et al. |
| 5,232,587 A | 8/1993 | Hegemier et al. |
| 5,284,580 A | 2/1994 | Shyh |
| 5,372,714 A | 12/1994 | Logue, Jr. |
| 5,378,376 A | 1/1995 | Zenner |
| 5,397,464 A | 3/1995 | Hannon |
| 5,403,474 A | 4/1995 | Emery |
| 5,405,539 A | 4/1995 | Schneider |
| 5,480,254 A | 1/1996 | Autry et al. |
| 5,486,287 A | 1/1996 | Murphy et al. |
| 5,518,024 A | 5/1996 | Weeks et al. |
| 5,535,554 A | 7/1996 | Harris, Jr. |
| 5,562,819 A | 10/1996 | Turner, Jr. et al. |
| 5,575,925 A | 11/1996 | Logue, Jr. |
| 5,632,889 A | 5/1997 | Tharp |
| 5,643,445 A | 7/1997 | Billias et al. |
| 5,670,039 A | 9/1997 | Harris |
| 5,779,888 A | 7/1998 | Bennett |
| 5,810,510 A | 9/1998 | Urriola |
| 5,820,762 A | 10/1998 | Bamer et al. |
| 5,855,774 A | 1/1999 | Boelter |
| 5,904,842 A | 5/1999 | Billias et al. |
| 5,980,740 A | 11/1999 | Harms et al. |
| 5,985,157 A | 11/1999 | Leckner et al. |
| 6,032,421 A | 3/2000 | Yamada |
| 6,077,448 A | 6/2000 | Tran-Quoc-Nam |
| 6,086,756 A | 7/2000 | Roy |
| 6,086,758 A | 7/2000 | Schilling et al. |
| 6,099,743 A | 8/2000 | Pedersen |
| 6,106,706 A | 8/2000 | Roy et al. |
| 6,106,707 A | 8/2000 | Morris et al. |
| 6,149,803 A | 11/2000 | DiLoreto, Jr. et al. |
| 6,178,565 B1 | 1/2001 | Franco |
| 6,190,545 B1 | 2/2001 | Williamson |
| 6,200,484 B1 | 3/2001 | McInnis |
| 6,231,758 B1 | 5/2001 | Morris et al. |
| 6,270,663 B1 | 8/2001 | Happel |
| 6,287,459 B1 | 9/2001 | Williamson |
| 6,294,095 B1 | 9/2001 | Lewis |
| 6,334,953 B1 | 1/2002 | Singleton |
| 6,379,541 B1 | 4/2002 | Nicholas |
| 6,428,692 B2 | 8/2002 | Happel |
| 6,478,954 B1 | 11/2002 | Turner, Jr. et al. |
| 6,517,709 B1 | 2/2003 | Cardwell et al. |
| 6,531,059 B1 | 3/2003 | Morris et al. |
| 6,537,446 B1 | 3/2003 | Sanguinetti |
| 6,551,023 B2 | 4/2003 | Allard |
| 6,562,233 B1 | 5/2003 | Schilling et al. |
| 6,638,424 B2 | 10/2003 | Stever et al. |
| 6,651,825 B2 | 11/2003 | Turner, Jr. et al. |
| 6,666,974 B2 | 12/2003 | Page |
| 6,668,390 B1 | 12/2003 | Gonzalez |
| 6,733,665 B1 | 5/2004 | Khalil |
| 6,767,456 B2 * | 7/2004 | Middleton ............ E03F 5/0404 |
| | | 210/170.03 |
| 6,797,161 B2 | 9/2004 | Use et al. |
| 6,797,162 B2 | 9/2004 | Happel |
| 6,800,195 B1 | 10/2004 | Batten et al. |
| 6,824,677 B2 | 11/2004 | Martinez |
| 6,866,153 B2 | 3/2005 | Turner, Jr. et al. |
| 6,869,525 B1 | 3/2005 | Happel |
| 6,872,029 B2 | 3/2005 | Allard et al. |
| 6,884,343 B2 | 4/2005 | Harris et al. |
| 6,936,163 B2 | 8/2005 | Use et al. |
| 6,939,461 B2 | 9/2005 | Use et al. |
| 6,951,607 B2 | 10/2005 | Use et al. |
| 6,974,540 B1 | 12/2005 | Fleischmann |
| 6,976,808 B2 | 12/2005 | Allard |
| 6,979,148 B2 | 12/2005 | Happel et al. |
| 6,986,621 B2 | 1/2006 | Allard |
| 6,994,783 B2 | 2/2006 | Use et al. |
| 6,998,039 B2 | 2/2006 | Harris et al. |
| 7,005,060 B2 | 2/2006 | Pitt et al. |
| 7,011,743 B2 | 3/2006 | Use et al. |
| 7,083,721 B2 | 8/2006 | McClure et al. |
| 7,094,337 B2 | 8/2006 | Williams et al. |
| 7,094,338 B2 | 8/2006 | Morris et al. |
| 7,112,274 B1 | 9/2006 | Sanguinetti |
| 7,128,341 B1 | 10/2006 | Dahl et al. |
| 7,128,832 B2 | 10/2006 | Wade |
| 7,132,045 B1 | 11/2006 | Trangsrud |
| 7,153,417 B2 | 12/2006 | Happel |
| 7,156,987 B1 | 1/2007 | Sanguinetti |
| 7,270,747 B2 | 9/2007 | Happel et al. |
| 7,282,142 B2 | 10/2007 | Kraft |
| 7,288,188 B2 | 10/2007 | Al-Assfour |
| 7,294,256 B2 | 11/2007 | Happel et al. |
| 7,309,420 B1 | 12/2007 | Trangsrud |
| 7,328,809 B2 | 2/2008 | Gigas et al. |
| 7,396,471 B2 | 7/2008 | Wimberger |
| 7,488,414 B2 | 2/2009 | Wimberger |
| 7,494,585 B2 | 2/2009 | Nino |
| 7,524,414 B1 | 4/2009 | Barragan |
| 7,658,857 B2 | 2/2010 | Wacome |
| 7,662,280 B1 | 2/2010 | Cooney |
| 7,722,763 B2 * | 5/2010 | Benty ................ B01D 21/0012 |
| | | 210/170.03 |
| 7,771,591 B2 | 8/2010 | Lucas |
| 7,785,464 B2 | 8/2010 | Happel |

(56) References Cited

U.S. PATENT DOCUMENTS

| | | |
|---|---|---|
| 7,815,800 B2 | 10/2010 | Komatsu |
| 7,824,551 B2 | 11/2010 | Wanielista et al. |
| 7,846,327 B2 | 12/2010 | Happel et al. |
| 7,883,620 B2 | 2/2011 | Owen |
| 7,897,047 B2 | 3/2011 | Wanielista et al. |
| 7,927,484 B2 | 4/2011 | Wanielista et al. |
| 7,955,507 B2 | 6/2011 | Wanielista et al. |
| 7,959,799 B2 | 6/2011 | Happel et al. |
| 7,981,283 B2 | 7/2011 | Happel et al. |
| 7,981,300 B2 | 7/2011 | Wacome |
| 8,002,984 B1 | 8/2011 | Wanielista et al. |
| 8,002,985 B1 | 8/2011 | Wanielista et al. |
| 8,017,006 B2 | 9/2011 | Lopez |
| 8,034,234 B2 | 10/2011 | Happel |
| 8,034,236 B1 | 10/2011 | Happel |
| 8,034,237 B2 | 10/2011 | Happel et al. |
| 8,038,879 B2 | 10/2011 | Kraft |
| 8,051,568 B2 | 11/2011 | Moody et al. |
| 8,083,937 B2 | 12/2011 | Happel |
| 8,101,079 B1 | 1/2012 | Wanielista et al. |
| 8,142,666 B1 | 3/2012 | Happel |
| 8,153,005 B1 | 4/2012 | Wanielista et al. |
| 8,216,453 B2 | 7/2012 | Moody et al. |
| 8,221,632 B2 | 7/2012 | McInnis et al. |
| 8,231,780 B2 | 7/2012 | Happel |
| 8,252,182 B1 | 8/2012 | Chang et al. |
| 8,366,923 B1 | 2/2013 | Happel |
| 8,393,827 B1 | 3/2013 | Happel |
| 8,425,150 B1 | 4/2013 | Happel |
| 8,491,797 B1 | 7/2013 | Happel |
| 8,622,652 B1 | 1/2014 | Happel |
| 8,651,767 B1 | 2/2014 | Happel |
| 8,658,044 B2 | 2/2014 | Cobb |
| 8,974,144 B1 | 3/2015 | Happel |
| 9,068,312 B1 | 6/2015 | Happel |
| 9,340,965 B2 | 5/2016 | Happel |
| 9,534,368 B1 | 1/2017 | Happel |
| 10,155,670 B1 * | 12/2018 | Happel ................ E03F 5/0404 |
| 10,238,993 B1 * | 3/2019 | Happel ................ E03F 5/0403 |
| 10,287,768 B1 * | 5/2019 | Happel ................ E03F 5/14 |
| 2001/0047954 A1 | 12/2001 | Happel |
| 2003/0026659 A1 | 2/2003 | Wu |
| 2003/0121846 A1 | 7/2003 | Use et al. |
| 2003/0132150 A1 | 7/2003 | Happel |
| 2003/0136717 A1 | 7/2003 | Tseng |
| 2003/0172487 A1 | 9/2003 | Thompson et al. |
| 2003/0175079 A1 | 9/2003 | Rappel et al. |
| 2004/0065601 A1 | 4/2004 | Martinez |
| 2004/0222159 A1 | 11/2004 | Peters, Jr. et al. |
| 2004/0226869 A1 | 11/2004 | McClure et al. |
| 2005/0051499 A1 | 3/2005 | Nino |
| 2005/0069386 A1 | 3/2005 | Happel et al. |
| 2005/0183997 A1 | 8/2005 | Happel et al. |
| 2005/0218049 A1 | 10/2005 | Happel |
| 2006/0016767 A1 | 1/2006 | Olson et al. |
| 2006/0096935 A1 | 5/2006 | Harding |
| 2006/0163130 A1 | 7/2006 | Happel et al. |
| 2006/0201860 A1 | 9/2006 | Happel et al. |
| 2006/0207922 A1 | 9/2006 | Dussich |
| 2009/0045135 A1 | 2/2009 | Khudenko et al. |
| 2009/0114579 A1 | 5/2009 | Dyer |
| 2009/0134081 A1 | 5/2009 | Happel |
| 2009/0166279 A1 | 7/2009 | Happel et al. |
| 2010/0032363 A1 | 2/2010 | Happel |
| 2010/0078370 A1 | 4/2010 | Happel |
| 2011/0168612 A1 | 7/2011 | Happel |
| 2011/0278237 A1 | 11/2011 | McInnis |
| 2014/0352729 A1 | 12/2014 | Happel |
| 2015/0129473 A1 | 5/2015 | Kent |

OTHER PUBLICATIONS

Aluminum Slide and Weir Glass, Water and Waste Water Valves and Gates, retrieved on Jun. 15, 2009, retrieved from http://ncvg.net/products/alumslideweir.html, 10 pages.

Happel, U.S. Utility Patent U.S. Appl. No. 14/151,284 filed Jan. 9, 2014, Office Action Summary dated Dec. 24, 2014, 12 pages.

* cited by examiner

HYDRO-VARIANT BAFFLE CARTRIDGE SYSTEM

CROSS REFERENCE TO RELATED APPLICATIONS

This application is a Continuation In Part of U.S. patent application Ser. No. 15/686,931 filed Aug. 25, 2017, which is a Continuation In Part of U.S. patent application Ser. No. 15/658,864 filed Jul. 25, 2017, which is a Continuation In Part of U.S. patent application Ser. No. 15/639,685 filed Jun. 30, 2017, which claims the benefit of priority to U.S. Provisional Patent Application Ser. No. 62/506,188 filed May 15, 2017, and U.S. patent application Ser. No. 15/639,685 filed Jun. 30, 2017 is a Continuation In Part of U.S. patent application Ser. No. 14/288,455 filed May 28, 2014, now abandoned, which claims the benefit of priority to U.S. Provisional Patent Application Ser. No. 61/828,958 filed May 30, 2013. The entire disclosure of each of the applications listed in this paragraph are incorporated herein by specific reference thereto.

FIELD OF INVENTION

This invention relates to water detention and treatment, and in particular to stormwater pollution prevention systems, vaults, boxes, and methods of treatment systems to capture pollutants from storm water runoff and prevent the conveyance of these pollutants from entering a receiving water body or landscape area, which is designed to be a part of a local permanent storm water drainage infrastructure, where the system combines both drainage conveyance, multi-level treatment techniques, variable hydraulic capabilities, and easy and inexpensive methods for servicing the systems.

BACKGROUND AND PRIOR ART

Since the passage of the Clean Water Act in 1972 the federal government through the Environmental Protection Agency (EPA) has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as storm water management.

Devices, systems and procedures that remove or reduce the pollutants and contaminates and/or control peak flows and volumes are often referred to as best management practices (BMPs). The BMPs can utilize natural, artificial or man-made techniques, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands.

BMPs typically use one or more mechanisms to remove the pollutants and contaminates. These mechanisms include sedimentation, filtration, absorption, adsorption, flocculation, stripping, leaching, bioremediation, and chemical processes including oxidation reduction, ion exchange, and precipitation.

Common pollutants of concern typically found in stormwater flow are sediment, foliage, litter, nutrients, metals, hydrocarbons, and bacteria. Because pollutants of concern vary significantly in their respective physical characteristics, a variety of techniques are applied to better address difficulties with capturing each pollutant of concern. For example; capturing hydrocarbons, which are typically in a liquid state, will require a different technique than capturing litter which are in a solid state.

Furthermore, storm water treatment systems can also be classified in relationship to the treatment level in which they are being used. In this respect, the term treatment is generally used to describe the unit processes that are used to reduce the quantities of pollutants and containments in storm water runoff.

For example, basic or pre-treatment typically refers to the removal of gross solids, sediments and larger debris through the processes of settling and screening. Enhanced or advanced treatment typically refers to processes or reducing targeted pollutants.

Filtration is a common form of enhanced treatment for storm water. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring storm water in contact with sorbent surfaces and the microorganisms that colonize these surfaces. Reducing the pollutant loadings to a receiving body of water can avoid diminishing the ability of the receiving body of water to counter the pollutant load through natural processes present within the receiving body of water. Every water body has a maximum pollutant load that it can withstand without the receiving body of water going into decline.

Although media filtration of stormwater can be effective for pollution removal, contact time with the media is an important factor with the projected removal efficiency of the media. Greater contact time will achieve a higher removal efficiency. Creating water detention upstream from a media filter will enable the water flow through a filter to be slowed down in order to achieve greater water contact time with the media.

Stormwater treatment systems that make use of filtration media can vary significantly just by making use of different types of filtration media. Understanding that the effectiveness will vary for different types of filtration media, generally, filtration media functions by combining the processes of physical filtration, sorbent or reactive surfaces, and biological activity. Physical filtration will physically prevent the conveyance of solids, sorbent or reactive surfaces will chemically bond to the pollutants, and the biological activity will consume pollutants.

Physical filtration whether by use of a filtration media or a screen can be an effective technique for capturing solids. Contained within and attached to the solids are a wide spectrum of pollutants of concern that can range from nutrients, to litter, to bacteria. A difficulty with physical filtration is that the collected solids can become so numerous that the rate of filtration is slowed to an ineffective flow rate. Servicing of the filtration media is typically required, and the servicing often requires the media to be replaced as a part of servicing.

Another issue with managing filtration media is how to do the servicing and replacement of the media as the media wears out or become saturated over time. A critical element for any stormwater treatment system is being able to service the system quickly and easily. The longer it takes to service a stormwater treatment system, the more money it will cost for both the manpower and service equipment. In addition, there is an element of servicing that is centered around the safety of the service technicians.

For a service technician to enter a stormwater treatment vault, OSHA requires the service technicians to adhere to a protocol referred to as the confined space protocol. The protocol requires the service technician that enters the vault to be equipped with a significant amount of specialized equipment. The confined space protocol also requires more personnel to be involved in the process, and a detailed report that a confined space entry took place must be created and submitted to an administrator. If the service technicians can complete the servicing without having to enter the vault, the additional manpower and time spent can be avoided. It is important to be able to service filtration media quick and easy without requiring a service technician to enter the confined space of a vault.

Applying polymers to stormwater flow is a type of stormwater treatment that can be adapted to high flows. Polymers applied to water purification techniques have been used for over 75 years. Common applications for polymers include drinking water purification, erosion control, sanitary sewer processing, dredging, lake water quality enhancement, and more.

Polymers work in the following way: Solids that are sufficiently small do not settle easily and have a tendency to maintain suspension in the water column. These solids typically have a negative charge which enables them to repel from each other, and they are kept in motion by the phenomenon known as Brownian motion. Brownian motion maintains the suspension of these particles in the water column, relatively equally diffused throughout the water. These particles often carry a wide spectrum of pollutants of concern. Polymers act on these tiny particles to neutralize their charge. Once the charge on these particles have been neutralized, random motion of the water will direct the particles to bump into each other and cohesion will coagulate these small particles to form larger particles.

As the particles increase in size the diffusion energy that previously enabled Brownian motion becomes insufficient to maintain suspension of these particles in the water column. As a result, these larger particles will settle out of the water column and prevented from being transported to a receiving body of water. In addition, an unused portion of the polymer application will find its way into the receiving downstream water body where it will act to enhance the water quality there.

There are a couple of common problems with using polymers for stormwater applications. If the stormwater is overdosed with polymers the water can become toxic and affect a receiving body of water in a negative way. Overdosing is a concern when applying liquid polymers. Liquid polymers require significant human oversight to avoid overdosing a stormwater flow which adds significant costs to liquid applications of polymers. To overcome the need for human oversight of polymer dosing, polymers have been engineered into solid logs that dissolve in flowing water. These logs will not dissolve unless water is flowing across the surface of the logs. These surfaces of the polymer logs erode from the water flow, and as the logs continue to erode, polymers are released into the water flow. Dosing concentration is a factor of water flow rate and the number of logs engaged.

A problem with polymer logs is that they can become covered by solids and blinded so that the water flow does not erode the surface of the log. Grass and leaves are especially likely to quickly blind a polymer log, and most stormwater drain pipes commonly convey large quantities of grass and leaves.

Another issue with managing polymer logs is servicing and replacing the logs as they erode away over time. A critical element for any stormwater treatment system is being able to service the system quickly and easily. The longer it takes to service a stormwater treatment system, the more money it will cost for both the manpower and service equipment. In addition, there is an element of servicing that is centered around the safety of the service technicians. For a service technician to enter a stormwater treatment vault, OSHA requires the service technicians to adhere to a protocol referred to as the confined space protocol. The protocol requires the service technician that enters the vault to be equipped with a significant amount of specialized equipment.

A confined space protocol also requires more personnel to be involved in the process, and a detailed report that a confined space entry took place must be created and submitted to an administrator. If the service technicians can complete the servicing without having to enter the vault, the additional manpower and time spent can be avoided. It is important to be able to service polymer logs quickly and easily without requiring a service technician to enter the confined space of a vault.

The reduction of nutrients that are conveyed via stormwater runoff are in the forefront of the various pollutants of concern. For example; the EPA has mandated that the state of Florida reduce the overall pollutant discharge of the state by approximately ⅓. To this end the EPA has established a numeric nutrient criteria for all water bodies of the state for total phosphorus (TP) and total nitrogen (TN). These nutrient numeric values cannot be exceeded within these water bodies of the state. The result of exceeding these numeric values will result with the state of Florida being fined by the EPA.

The reduction of metals that are conveyed via stormwater runoff is also in the forefront of pollutants of concern. Mining can release large quantities of dissolved metals into stormwater runoff which eventually flows into streams and rivers with contain wildlife. Salman are extremely sensitive to metals in stormwater because they have delicate organs that are in continuous contact with the water in which the swim. Even low levels of dissolved metals can cause life threatening physiological functions. In addition, low levels of metals will bio-accumulate with in the tissues of a salmon concentrating the metals. In turn, other wildlife and humans will consume salmon along with the toxic metals that have accumulated and concentrated within the salmon's tissues. The EPA is on the forefront for imposing rules and guidelines to prevent metals pollution within United States water bodies.

An underlying problem with stormwater treatment is that detention of stormwater to achieve a greater pollutant removal efficiency reduces the hydraulic conveyance which may compromise the hydrology of the water shed. Historically, stormwater management has been primarily about flood prevention. Because of both governmental mandates and environmental necessity, today stormwater management includes the prevention of the conveyance of pollutants. There is a necessity to prevent both flooding and the conveyance of pollutants. Because there is not a single stormwater treatment technique that is the best for removing all pollutants of concern, a treatment system that combines multiple techniques in a treatment train arrangement will likely yield a wide spectrum of stormwater treatment success.

In addition, there is an economic consideration for applying stormwater treatment. For example; the costs and frequency for servicing a stormwater treatment system will be an indicator as to the sustainability of the system . . . all stormwater treatment systems require servicing.

Thus, the need exists for solutions to the above problems with the prior art.

SUMMARY OF THE INVENTION

A primary objective of the present invention is to provide stormwater pollution prevention systems, vaults, boxes and methods that prevents the conveyance of a wide spectrum of pollutants from being conveyed to a receiving body of water or landscape area.

A secondary objective of the present invention is to provide stormwater pollution prevention systems, vaults, boxes and methods that incorporates multiple stages and processes for the treatment of water shed from an area as a result of rain.

A third objective of the present invention is to provide stormwater pollution prevention systems, vaults, boxes and methods with a treatment process, that makes use of filtration media, hydro dynamic separation of solids from the water flow passing through the treatment system, polymer dosage, and the detention of water within or adjacent to the treatment system.

A fourth objective of the present invention is to provide stormwater pollution prevention systems, vaults, boxes and methods with an automatic hydraulic variance of the treatment system that will enable a high level of treatment for low to medium flow rain events, without compromising the hydrology of the water shed during high flow rain events.

The novel stormwater pollution prevention system that prevents the conveyance of a wide spectrum of pollutants from being conveyed to a receiving body of water or landscape area. The system incorporates multiple stages and processes for the treatment of water shed from an area as a result of rain.

As a part of the treatment process, this system can make use of filtration media, hydro dynamic separation of solids from the water flow passing through the treatment system, polymer dosage, and the detention of water within or adjacent to the treatment system. The automatic hydraulic variance of the treatment system will enable a high level of treatment for low to medium flow rain events, without compromising the hydrology of the water shed during high flow rain events.

A stormwater pollution prevention system can include a floating skimmer having a float that extends across and along a top of a panel, the panel having outer side edges being slidably mounted in tracks along opposite sides of water treatment box, wherein the floating skimmer panel rises from adjacent to and above a top of a baffle wall in the water treatment box, a baffle opening adjacent to a static waterline in the water treatment box, and a removable cartridge on the outlet side of the baffle opening covering the outlet side of the baffle opening, wherein the removable cartridge provides for treating pollutants passing though the opening in the baffle.

The float can include a plurality of floats extending between one side of the vault to another side of the vault.

The opening in the baffle can include a plurality of horizontal openings in the baffle extending from one side of the vault to another side of the vault, and the removable cartridge includes a plurality of removable cartridges, each cartridge for covering the outlet side of the plurality of the openings in the baffle, wherein the plurality of removable cartridges provides for treating the pollutants passing though the openings in the baffle.

The cartridge can include a first screen covering the inlet side of the cartridge, a second screen covering the outlet side of the cartridge, and a treatment media between the first screen and the second screen, the treatment media being replaceable by when the first and second screens are removed.

The removable cartridge can include side edges that allow for the removable cartridge to slide up and down along tracks on both sides of the opening in the baffle.

The removable cartridge can include a handle on a top of the removable cartridge and an elongated servicing tool with an attachment end which allows for removing the cartridge by the servicing tool, without requiring entry into the water treatment box.

The cartridge can include a first screen covering the inlet side of the cartridge, a second screen covering the outlet side of the cartridge, and a treatment polymer between the first screen and the second screen, the treatment media being replaceable by when the first and second screens are removed.

The treatment polymer can include at least one polymer log.

The removable cartridge can include side edges that allow for the removable cartridge to slide up and down along tracks on both sides of the opening in the baffle.

The removable cartridge can include a handle on a top of the removable cartridge and an elongated servicing tool with an attachment end which allows for removing the cartridge by the servicing tool, without requiring entry into the water treatment box.

The system can also include a screen system adjacent to an inlet to the water treatment box in front of the floating skimmer.

The screen system can include at least a second baffle in the treatment box between the inlet and the first baffle and at least one deflector on the second baffle.

The system can further include a sloped floor in the treatment box and water jets along corners of the walls and the floor for moving debris along the sloped floor.

The cartridge can include a mesh tube for housing a loose media inside.

The cartridge can include a mesh tube for housing a polymer log inside.

A stormwater treatment system can include a floating skimmer with at least one float extending across a top of a vertical flat panel, the panel having outer side edges being slidably mounted in tracks along opposite sides of water treatment box, wherein the floating skimmer panel rises from adjacent to and above a top of a baffle in the water treatment box when, at least one horizontal opening in the baffle below a static waterline in the water treatment box, a pair of parallel tracks covering each of the baffle openings on an outlet side of the baffle, and at least one cartridge, each cartridge sliding in each pair of the tracks, wherein the removable cartridges provides for treating pollutants passing though the opening in the baffle.

Each cartridge can include a first screen covering the inlet side of the cartridge, a second screen covering the outlet side of the cartridge, and a treatment media between the first screen and the second screen, the treatment media being replaceable by when the first and second screens are removed.

Each cartridge can include a first screen covering the inlet side of the cartridge, a second screen covering the outlet side of the cartridge, and a treatment polymer between the first screen and the second screen, the treatment media being replaceable by when the first and second screens are removed.

Each cartridge can include a mesh tube for housing a loose treatment media inside.

Each cartridge can include a mesh tube for housing a polymer log inside.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
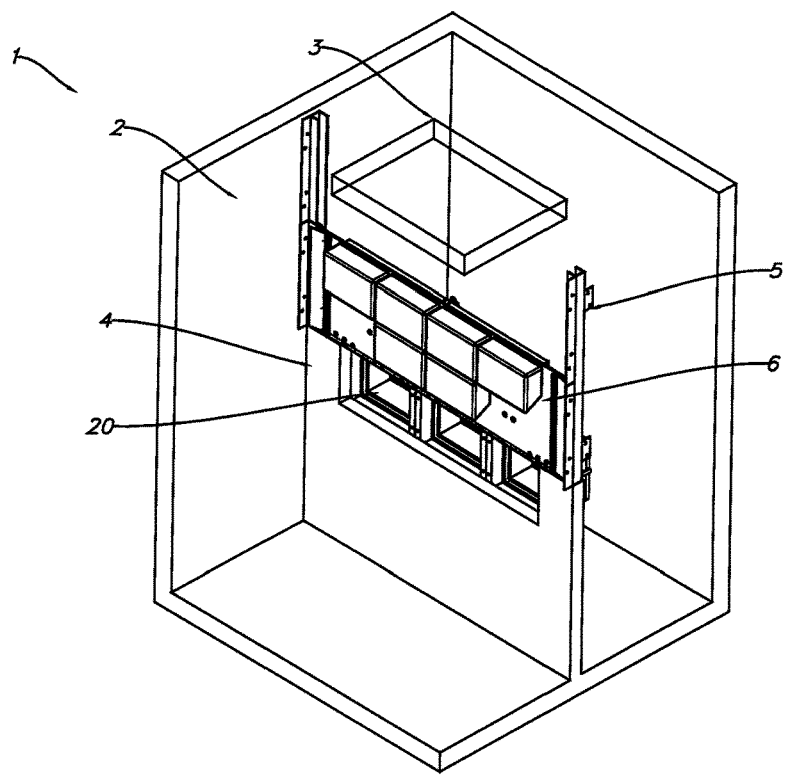
FIG. 1 is an upper front right perspective view of a last stage of a media cartridge stormwater pollution prevention system with skimmer, skimmer track, baffle, media cartridges and cartridge track.
Figure 2:
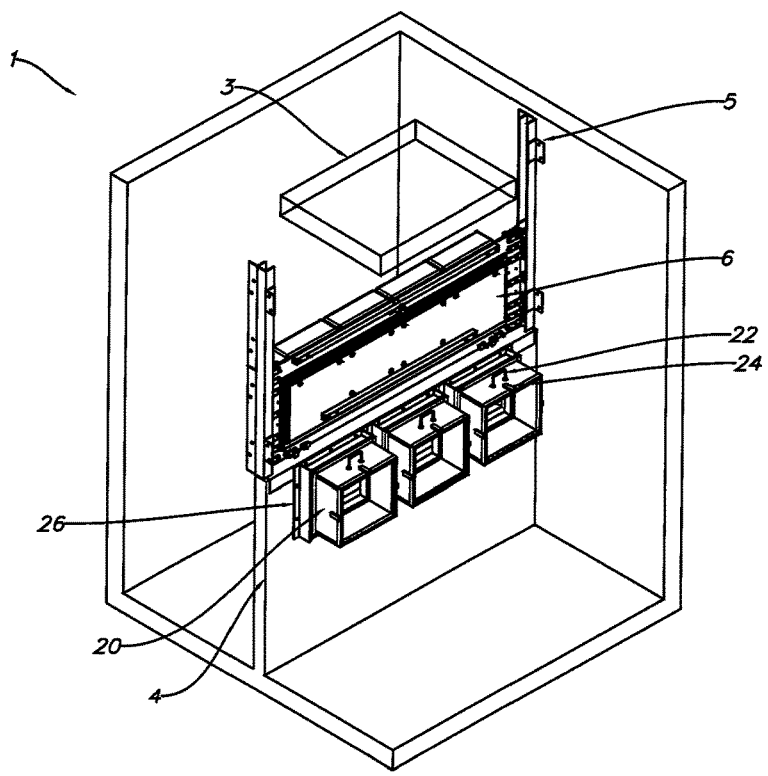
FIG. 2 is an upper rear left perspective view of the stormwater pollution prevention system of FIG. 1.
Figure 3:
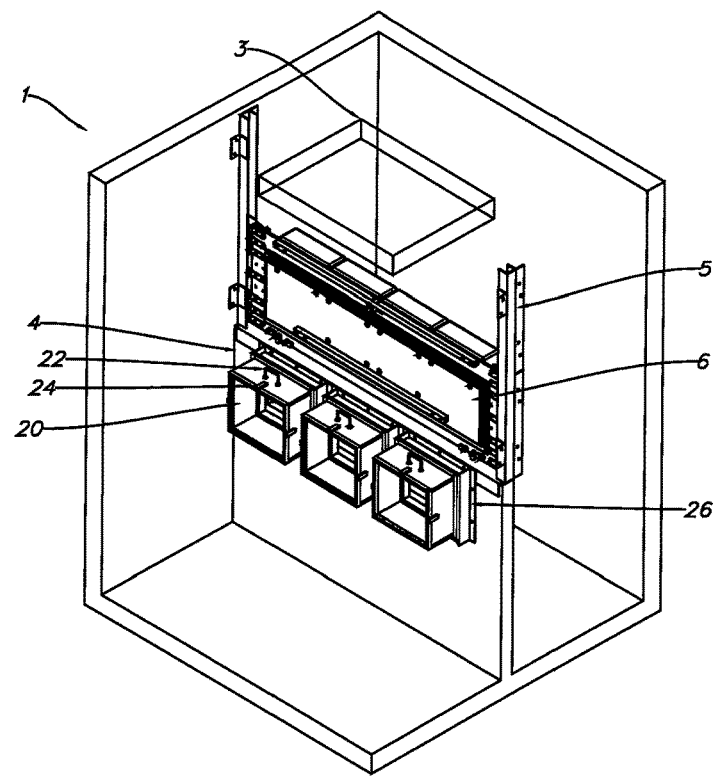
FIG. 3 is an upper rear right perspective view of the stormwater pollution prevention system of FIG. 1.
Figure 4:
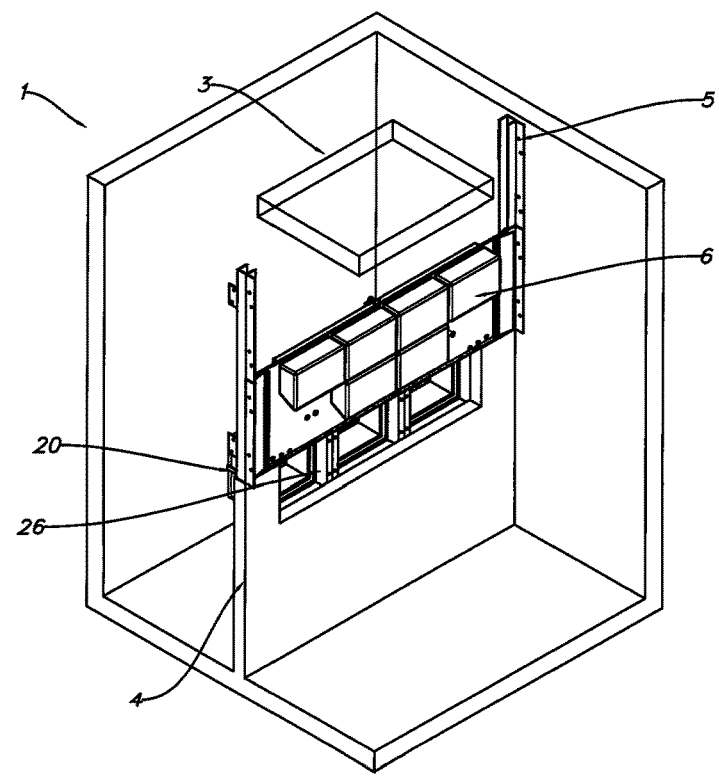
FIG. 4 is an upper front left perspective view of the stormwater pollution prevention system of FIG. 1.

A list of components will now be described.
1 media cartridge vault/box system
2 vault/box
3 access point
4 baffle (wall)
5 skimmer tracks
6 floating skimmer
20 media cartridge(s)
22 cartridge handles
23 media
24 cartridge locks
25 screen(s)
25D screen door(s)
25B screen backing(s)
26 cartridge track/frame system
30 polymer cartridge vault/box system
40 polymer cartridge(s)
42 cartridge handles
43 polymer log(s)/polymer material
44 cartridge locks
45 screen(s)
45D screen door(s)
45B screen backing(s)
46 cartridge track/frame system
50 entire stormwater system
60 screen system
65 screen legs
70 deflector(s)
100 elongated servicing tool
105 hook end of tool
200 hydro-slide system/spray system
210 water connection/attachment fitting
220 water line
230 spray bars along corner of floor
240 spray lever
250 spray knife
260 sloped floors Media Cartridge System FIG. 1 is an upper front right perspective view of a last stage of a media cartridge stormwater pollution prevention system 1 with floating skimmer 6, skimmer track 5, baffle 4, media cartridges 20 and cartridge tracks 26. FIG. 2 is an upper rear left perspective view of the stormwater pollution prevention system 1 of FIG. 1. FIG. 3 is an upper rear right perspective view of the stormwater pollution prevention system 1 of FIG. 1. FIG. 4 is an upper front left perspective view of the stormwater pollution prevention system 1 of FIG. 1.

Figure 9:
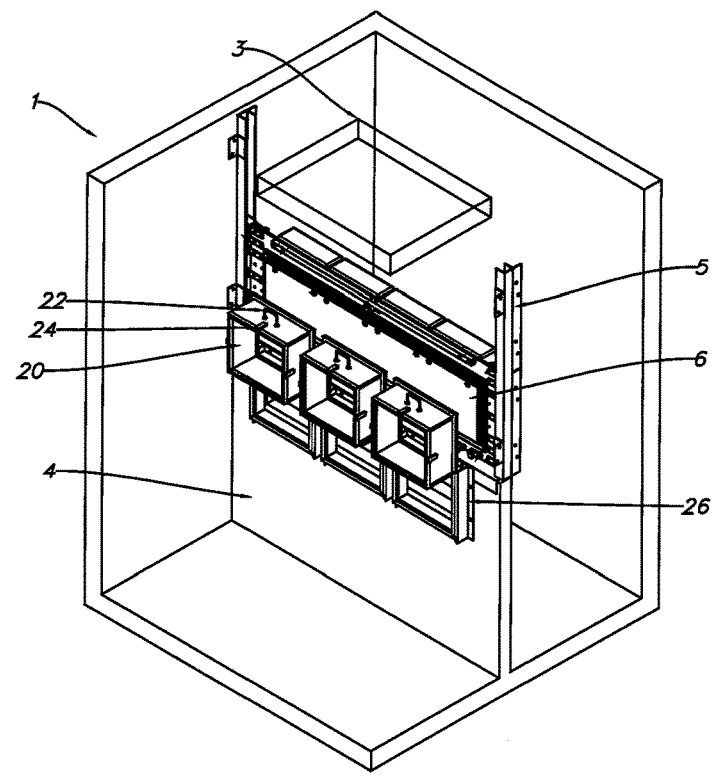
FIG. 9 is another view of the stormwater pollution prevention system of FIG. 3 with the media cartridges partially removed.

FIG. 9 is another view of the stormwater pollution prevention system 1 of FIG. 3 with the media cartridges 20 partially removed.

Referring to FIGS. 1-4 and 9, the media cartridge system 1 can be used inside of a water treatment vault/box having an upper access point 3, and which can have a baffle wall 4 separating portions of the vault/box from one another. On the water input side of the baffle 4 can be a horizontal row of a plurality of generally rectangular openings, with the output side of each of these openings having parallel vertical tracks 26 for allowing a plurality of generally box shaped media cartridges 20 to be slidably mounted therein. Each of the media cartridges 20 can have handles 22 on the top for allowing individual cartridges 20 to be slidably mounted into and out of the respective pairs of cartridge tracks 26. The media cartridges 20 with cartridge locks 24 will be described in greater detail in reference to FIGS. 19-25 and 27

The floating skimmer 6 can include a panel having a plurality of floats in a row, where the floating skimmer 6 slides up and down within skimmer track(s) 5, based on water height within the vault/box 2. The floating skimmer 6 and skimmer track(s) 5 can use the technology shown and described in reference to U.S. Pat. No. 9,534,368 to Happel, who is the same inventor as the subject patent application, and which is incorporated by reference in its' entirety.

Polymer Cartridge System

Figure 5:
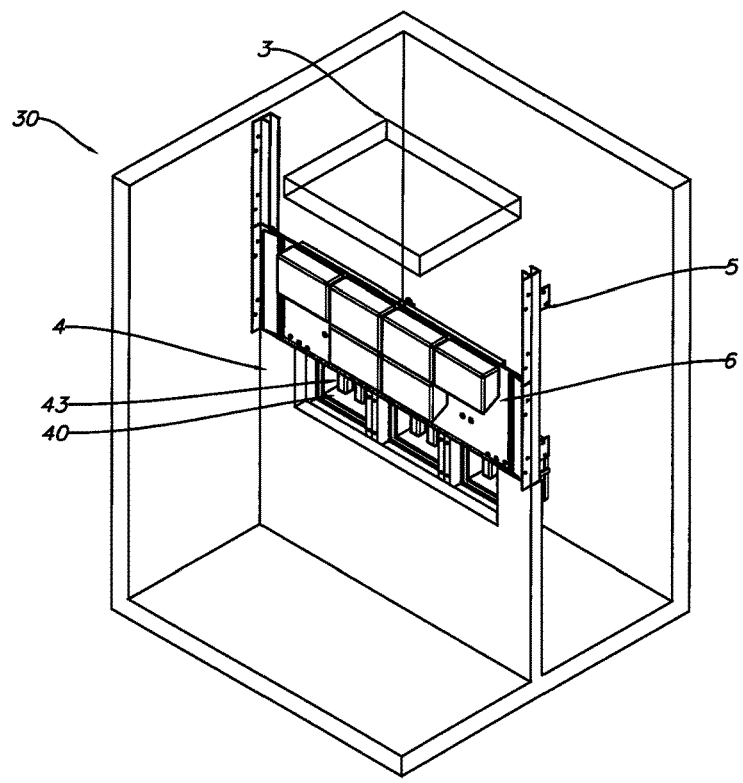
FIG. 5 is an upper front right perspective view of a last stage of a polymer cartridge stormwater pollution prevention system with skimmer, skimmer track, baffle, polymer cartridges and cartridge track.
Figure 6:
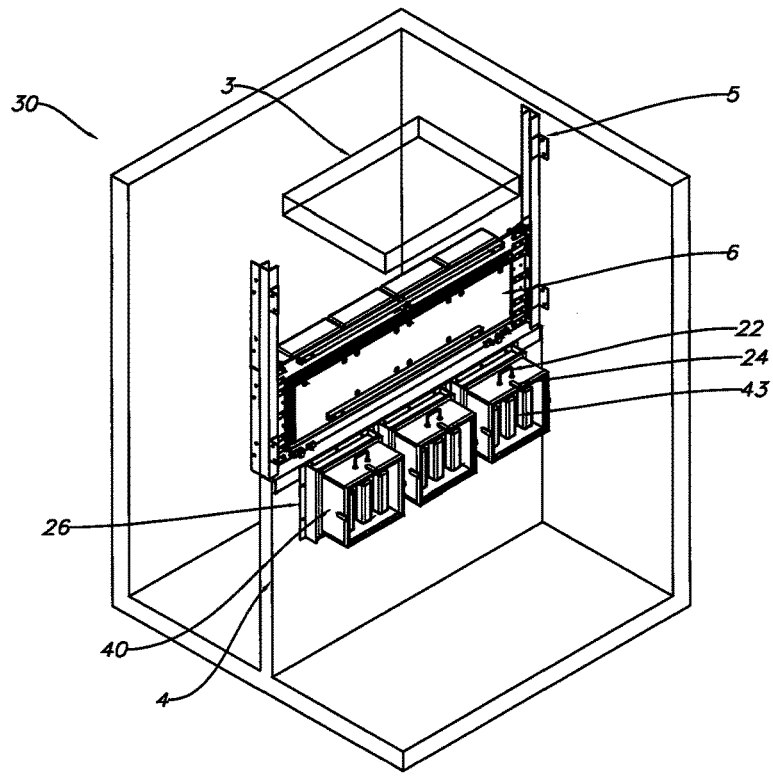
FIG. 6 is an upper rear left perspective view of the stormwater pollution prevention system of FIG. 5.
Figure 7:
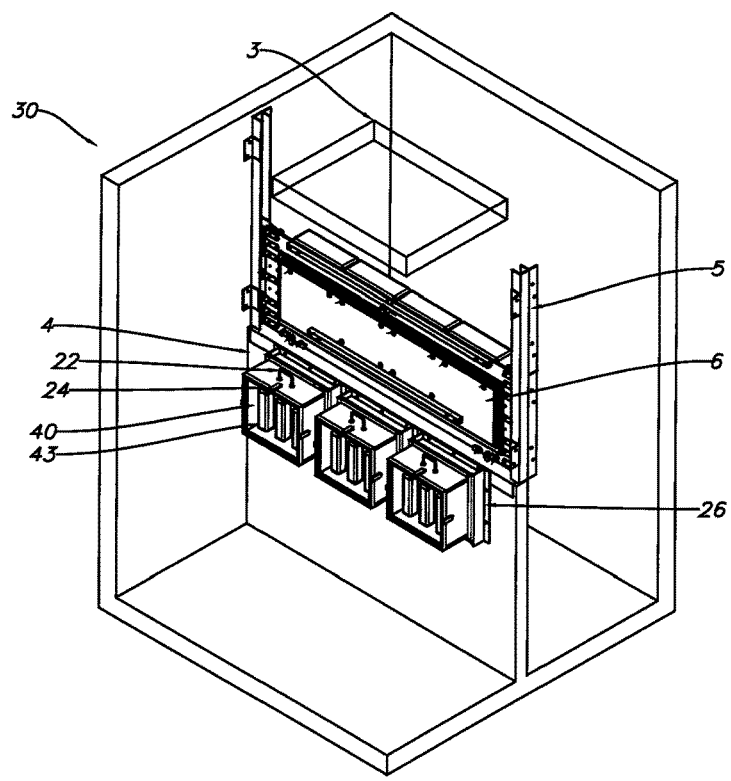
FIG. 7 is an upper rear right perspective view of the stormwater pollution prevention system of FIG. 5.
Figure 8:
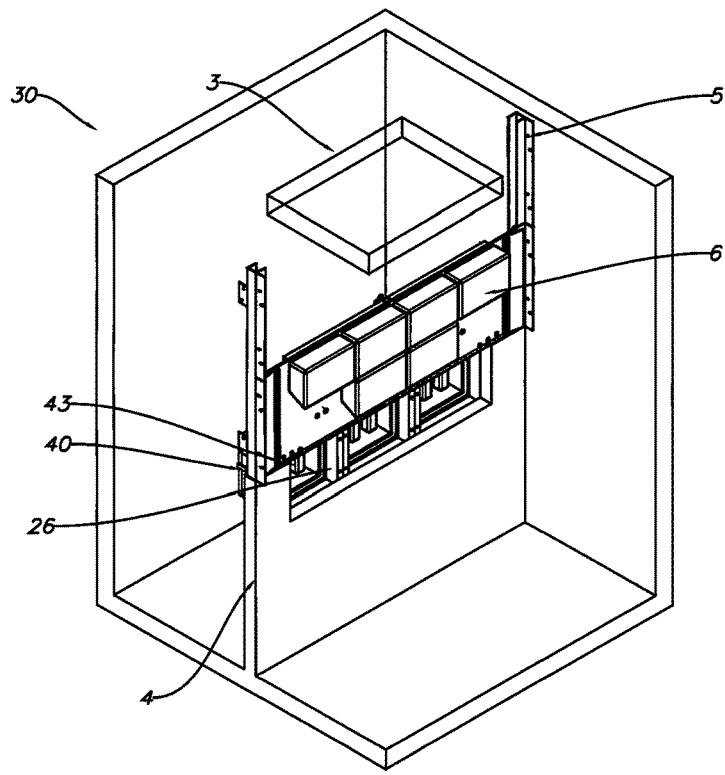
FIG. 8 is an upper front left perspective view of the stormwater pollution prevention system of FIG. 5.

FIG. 5 is an upper front right perspective view of a last stage of a polymer cartridge stormwater pollution prevention system 30 with floating skimmer 6, skimmer track 5, baffle 4, polymer cartridges 40 and cartridge tracks 46. FIG. 6 is an upper rear left perspective view of the stormwater pollution prevention system 30 of FIG. 5. FIG. 7 is an upper rear right perspective view of the stormwater pollution prevention system 30 of FIG. 5. FIG. 8 is an upper front left perspective view of the stormwater pollution prevention system 30 of FIG. 5.

Figure 10:
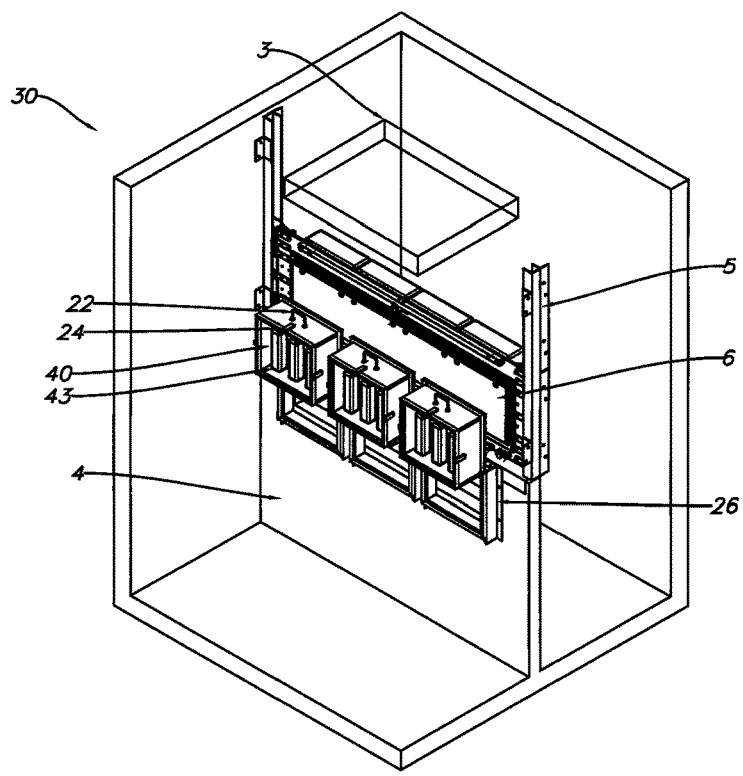
FIG. 10 is another view of the stormwater pollution prevention system of FIG. 7 with the polymer cartridges partially removed.

FIG. 10 is another view of the stormwater pollution prevention system 30 of FIG. 7 with the polymer cartridges 40 partially removed.

Referring to FIGS. 5-8 and 10, the polymer cartridge system 30 can be used inside of a water treatment vault/box 2 having an upper access point 3, and which can have a baffle wall 4 separating portions of the vault/box from one another. On the water input side of the baffle 4 can be a horizontal row of a plurality of generally rectangular openings, with the output side of each of these openings having parallel vertical tracks 36 for allowing a plurality of generally box shaped polymer cartridges 30 to be slidably mounted therein. Each of the polymer cartridges 40 can have handles 42 on the top for allowing individual cartridges 40 to be slidably mounted into and out of the respective pairs of cartridge tracks 46. The media cartridges 40 with cartridge locks 44 will be described in greater detail in reference to FIGS. 19-26 and 28.

The floating skimmer 6 can include a panel having a plurality of floats in a row, where the floating skimmer 6 slides up and down within skimmer track(s) 5, based on water height within the vault/box 2. The floating skimmer 6 and skimmer track(s) 5 can use the technology shown and described in reference to U.S. Pat. No. 9,534,368 to Happel, who is the same inventor as the subject patent application, and which is incorporated by reference in its' entirety.

Figure 11:
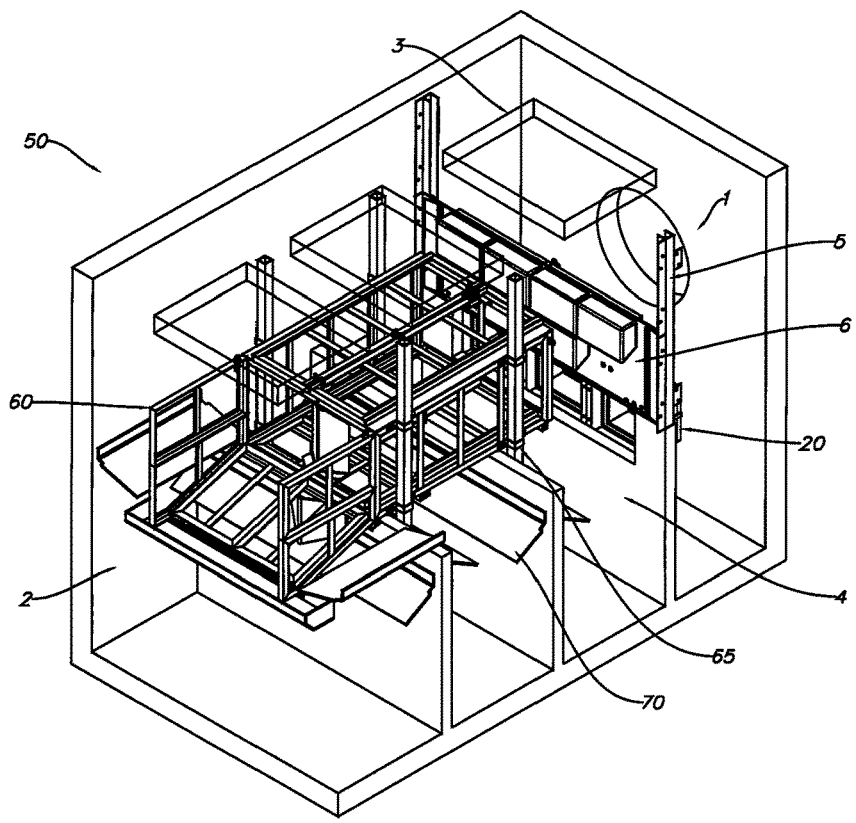
FIG. 11 is an upper front right perspective view of an entire stormwater pollution prevention system which includes the skimmer, skimmer track, baffle, media cartridges and cartridge track of FIG. 1.
Figure 12:
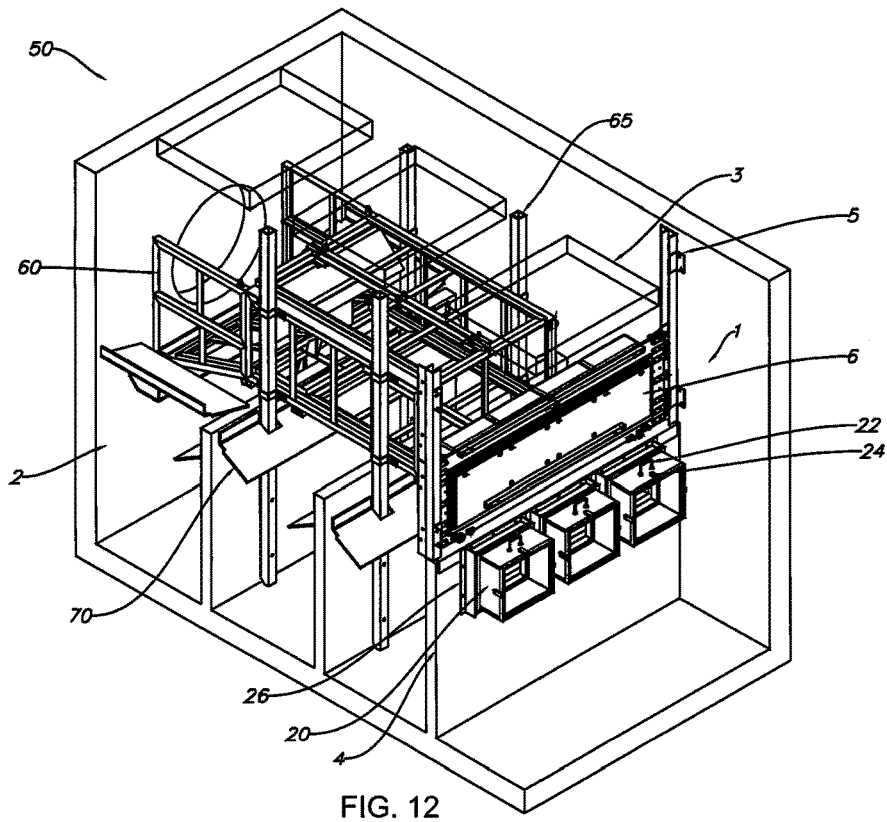
FIG. 12 is an upper rear left perspective view of an entire stormwater pollution prevention system of FIG. 11.
Figure 13:
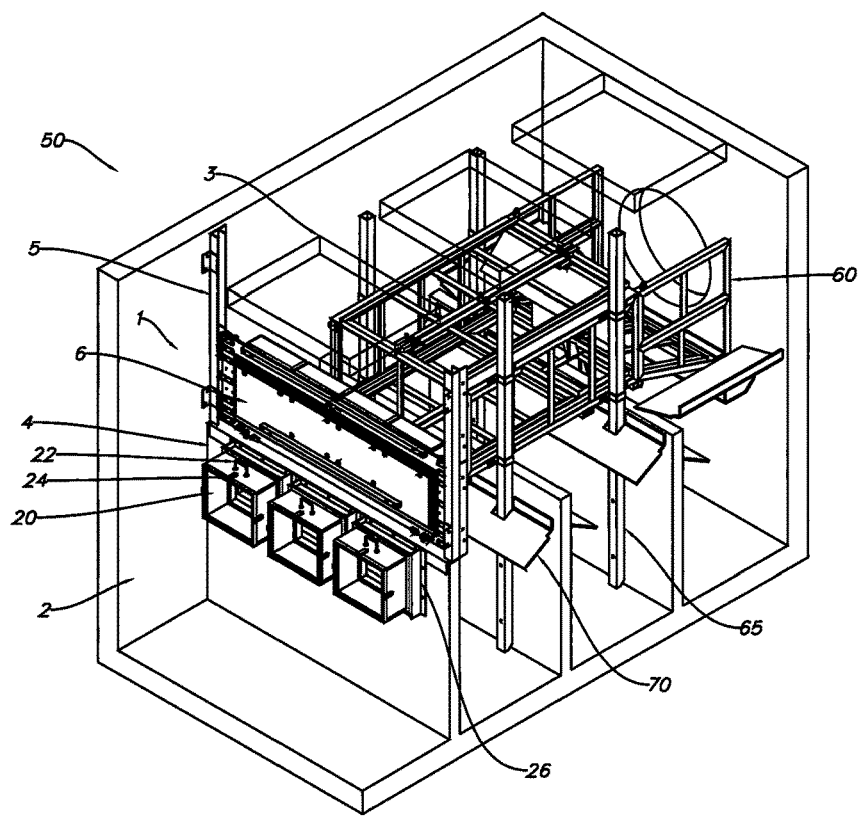
FIG. 13 is an upper rear right perspective view of an entire stormwater pollution prevention system of FIG. 11.
Figure 14:
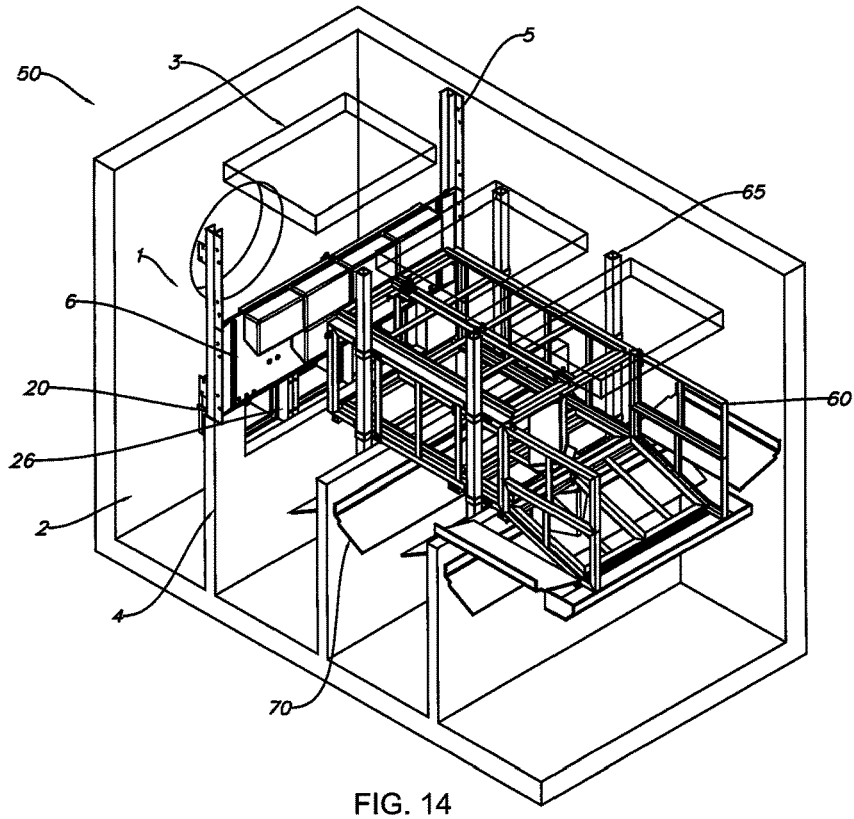
FIG. 14 is an upper front left perspective view of the entire stormwater pollution prevention system of FIG. 11.

FIG. 11 is an upper front right perspective view of an entire stormwater pollution prevention system 50 which includes a screen system 60, screen leg 62, interior baffle walls with deflector(s) 70, as well as the float skimmer 7, skimmer track 5, baffle(s) 4, media cartridges 20 and cartridge tracks 26 of FIG. 1. FIG. 12 is an upper rear left perspective view of an entire stormwater pollution prevention system 50 of FIG. 11. FIG. 13 is an upper rear right perspective view of an entire stormwater pollution prevention system 50 of FIG. 11. FIG. 14 is an upper front left perspective view of the entire stormwater pollution prevention system 50 of FIG. 11.

Referring to FIGS. 1-4, 9 and 11-14, the novel media cartridge system 1 can be incorporated into a stormwater box/vault 2 and include a screen system 60 supported on a screen leg 65. A plurality of floor mounted baffles 4 some with deflectors 70 can separate the box/vault 2 into different chambers. The screen system 60 and deflectors 70 on baffles 4 can function similarly to those shown and described in U.S. Pat. No. 9,534,368 to Happel, which is incorporated by reference in its' entirety.

Figure 15:
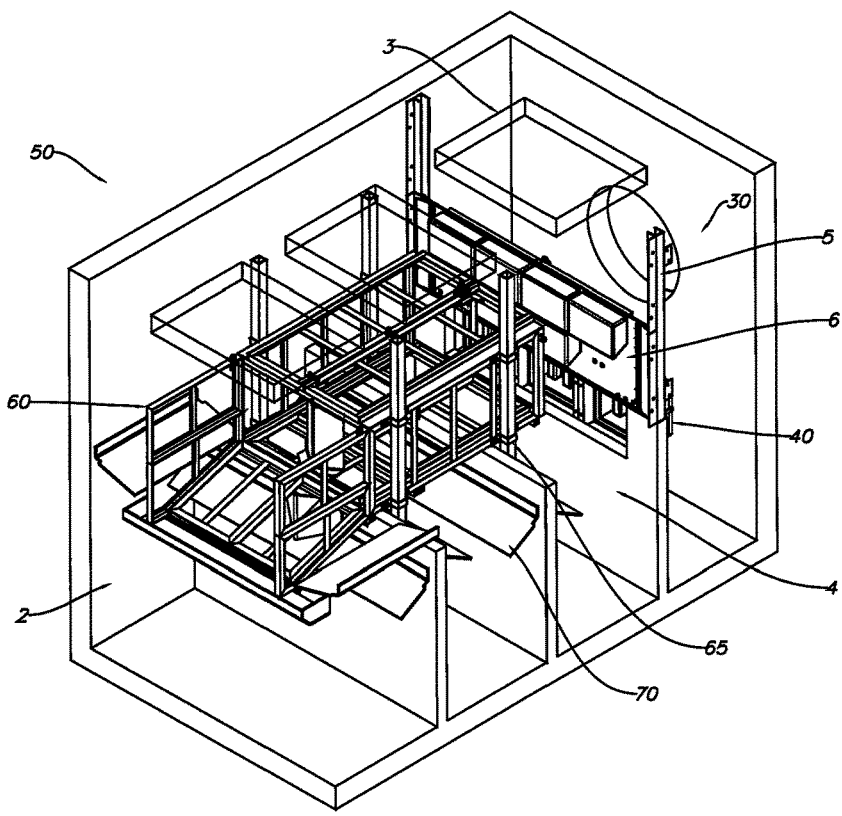
FIG. 15 is an upper front right perspective view of an entire stormwater pollution prevention system which includes the skimmer, skimmer track, baffle, polymer cartridges and cartridge track of FIG. 5.
Figure 16:
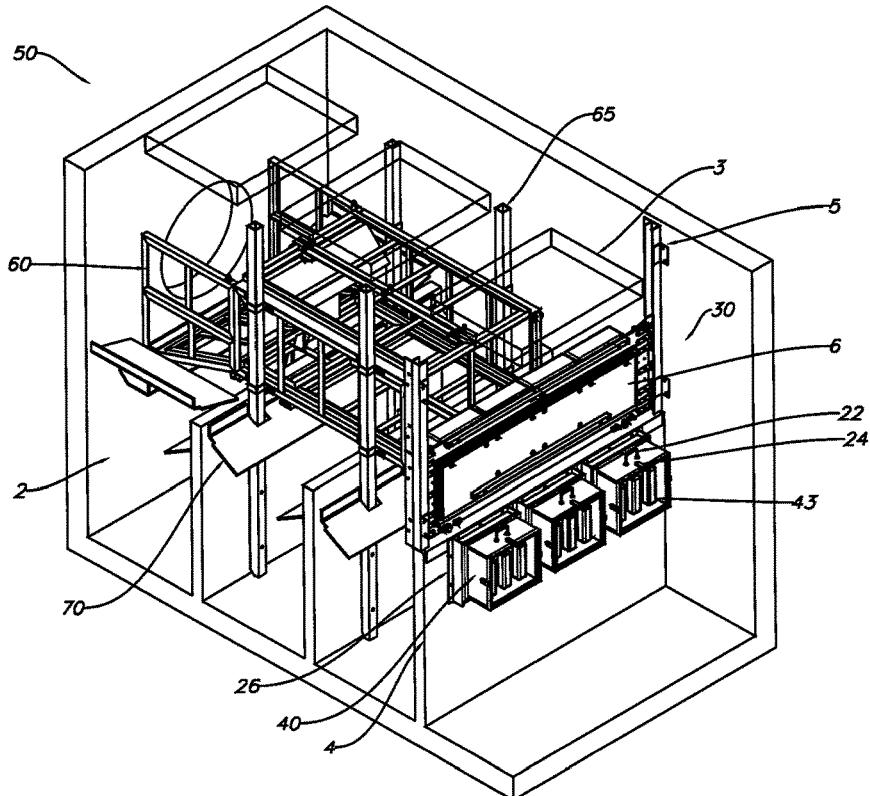
FIG. 16 is an upper rear left perspective view of the entire stormwater pollution prevention system of FIG. 15.
Figure 17:
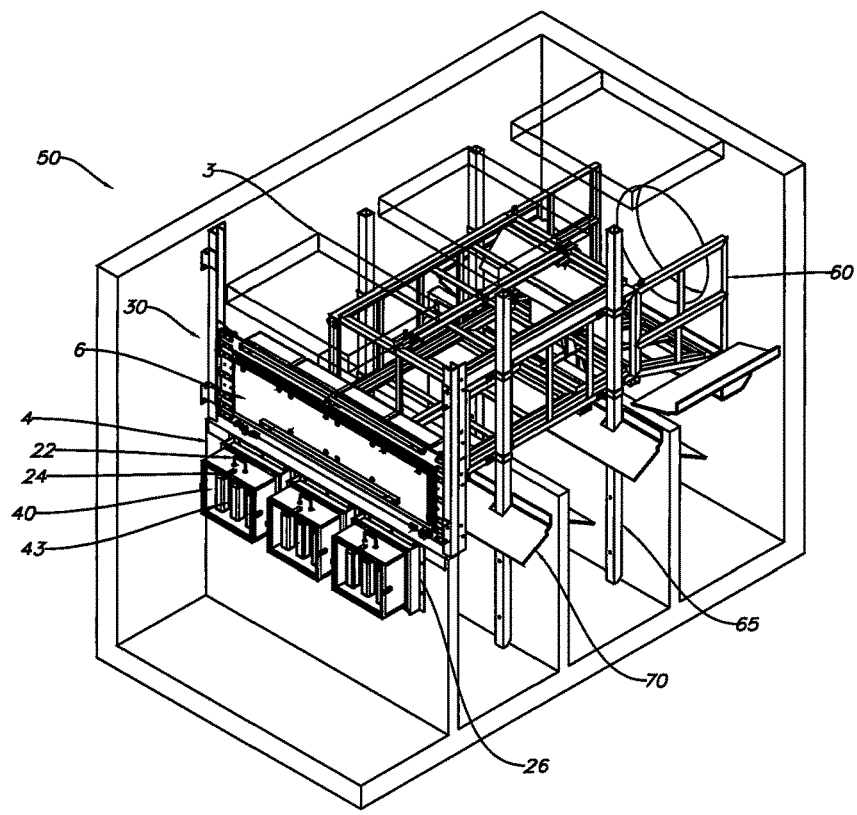
FIG. 17 is an upper rear right perspective view of the entire stormwater pollution prevention system of FIG. 15.
Figure 18:
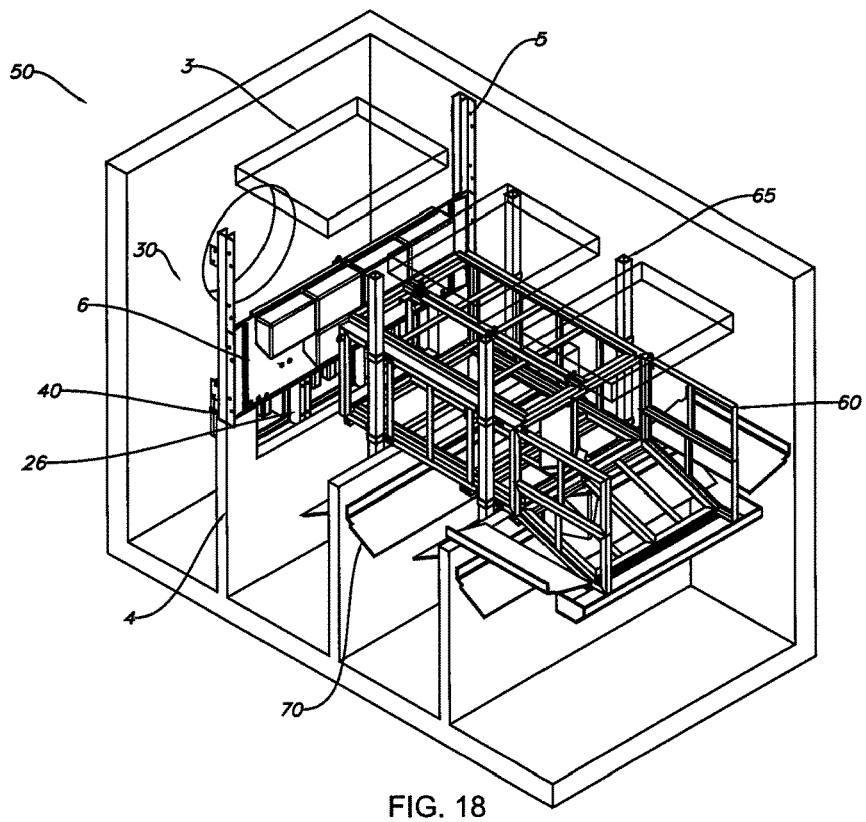
FIG. 18 is an upper front left perspective view of the entire stormwater pollution prevention system of FIG. 15.

FIG. 15 is an upper front right perspective view of an entire stormwater pollution prevention system 50 which includes a screen system 60, screen leg 62, interior baffle walls with deflector(s) 70, as well as the float skimmer 7, skimmer track 5, baffle(s) 4, and polymer system 30 with polymer cartridges 40 and cartridge track 46 of FIG. 5. FIG. 16 is an upper rear left perspective view of the entire stormwater pollution prevention system 50 of FIG. 15. FIG. 17 is an upper rear right perspective view of the entire stormwater pollution prevention system 50 of FIG. 15. FIG. 18 is an upper front left perspective view of the entire stormwater pollution prevention system 50 of FIG. 15.

Referring to FIGS. 5-8, 10 and 15-18, the novel polymer cartridge system 30 with polymer cartridges 40 having polymer logs 43, can be incorporated into a stormwater box/vault 2 and include a screen system 60 supported on a screen leg 65. A plurality of floor mounted baffles 4 some with deflectors 70 can separate the box/vault 2 into different chambers. The screen system 60 and deflectors 70 on baffles 4 can function similarly to those shown and described in U.S. Pat. No. 9,534,368 to Happel, which is incorporated by reference in its' entirety.

Settling Zone

Referring to FIGS. 1-18, a pipe will typically convey stormwater flow into the vault 2 of the invention. The cross-sectional area of conveyance within the vault 2 will be substantially greater than that of the inflow pipe, resulting in a substantial drop in the linear velocity of the water flow. When the linear velocity of the water flow is reduced the turbulence will also be reduced. The water flow will calm and the turbulence required to keep solids suspended in the water column will no longer exist. The lack of turbulence inside the vault will enable a major portion of the solids to settle to the bottom of the vault where the solids will remain until servicing is performed. The space in which solids settle across the bottom of the vault is the settling zone.

The Hydro-Variant Skimmer System

Referring to FIGS. 1-19, a hydro-variant skimmer system 1/30 in a system 50 acts as diversion barrier for low to medium water flow rates and has the ability to float and move upward when the hydraulic gradeline (HGL) in the vault is sufficiently high. During low to medium flows the diversion barrier will rest on top of a fixed baffle 4.

The fixed baffle 4 will extend to the floor of the vault 2 and can act as a mounting surface and support structure for cartridges attached along the downstream side of the baffle.

The fixed baffle 4 will have openings that provide water conveyance from the upstream side of the baffle 4 to the downstream side of the baffle and convey this water flow into the cartridges 20/40. For low to medium flows the hydro-variant skimmer 6 will be at rest on top of the baffle 4.

While the hydro-variant skimmer 6 is at rest on top of the baffle 4, the skimmer 6 will act as a diversion barrier and divert water downward toward the filter cartridges 20/40. As the flow rates increase and the HGL in the vault 2 rises, and once the HGL is sufficiently elevated, the diversion barrier will begin to float and move upward and begin functioning as a skimmer.

As the floating skimmer 6 rises a space is formed between the top of the baffle 4 and the bottom of the skimmer 6. The space between the bottom of the skimmer 6 and the top of the baffle 4 functions as bypass conveyance around the cartridges 20/40. Water flow that is conveyed through the bypass conveyance will not engage the cartridges 20/40. Because any media filtration system has the potential to clog and flow not water, it is critical to provide a conveyance for stormwater flow that is adequately sized so that the hydrology of the upstream water shed cannot be compromised. Adequate stormwater flow is essential to prevent flooding.

With minimal rise of the hydro-variant skimmer the headloss created by the cartridges 20/40 will be completely offset. Making use of the hydro-variant skimmer will enable media filtration to be placed inline with a storm drain pipe without compromising the hydrology of the water shed. As the hydro-variant skimmer 6 floats upward it functions as a skimmer 6 which prevents floatables from passing through the vault. Eventually the rain event will diminish and the HGL will reduce in elevation. The floatables that have collected along the upstream side of the hydro-variant skimmer will be retained within the vault and prevented from being conveyed to a receiving body of water. While the skimmer 6 is significantly elevated most of the water flow does not engage the cartridges for treatment.

However, the most polluted water flow occurs early in a rain event and the hydrovariant skimmer 6 will not rise until later in the rain event. So before the floating barrier begins to rise, the media filter will provide treatment for the most polluted portion of the rain event. In addition, most rain events will not be intense enough to raise the HGL in the vault system to an elevation that will enable the hydro-variant skimmer to float. For example, in Tallahassee Fla., a city within the rainiest region in Florida, 44% of all rain events are less than 0.1 inches of rainfall. For all locations around the entire United States, most rain events do not yield high volumes of water flow from rain events.

A unique feature of the hydro-variant skimmer is that it's buoyancy is only dependent on the HGL on the upstream side of the skimmer. If there is no water against the downstream side of the hydro-variant skimmer the skimmer will still float. This is accomplished by having the required float buoyancy along the top upstream side of the skimmer panel, and having a space between the skimmer panel 6 and the float or floats.

The space between the float 6 and skimmer panel is such that the float can be encapsulated by water which creates the adequate buoyancy to float the hydro-variant skimmer upward. Without the space between the upper float or floats and the skimmer panel, upstream side buoyancy cannot be achieved. The space occupied by the hydro-variant skimmer is above and or toward the upstream side of the fixed baffle. It is critical that the hydrovariant skimmer not interfere with the removal of the cartridges 20/40 that will be positioned along the backside of the baffle 4.

Servicing of Media Cartridges and Polymer Cartridges

Figure 19:
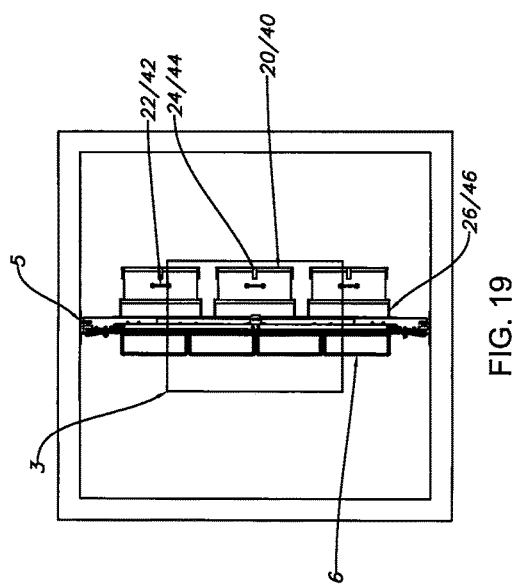
FIG. 19 is a top view of the last stage of the stormwater pollution prevention system of FIGS. 1 and 5.
Figure 20:
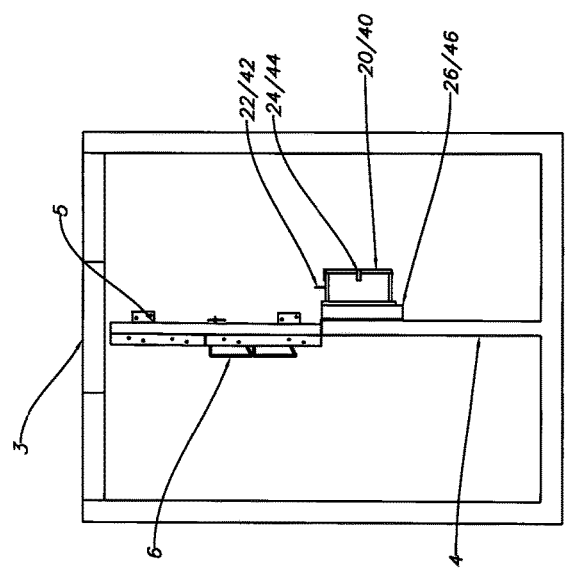
FIG. 20 is a right side view of the last stage of the stormwater pollution prevention system of FIG. 19.
Figure 21:
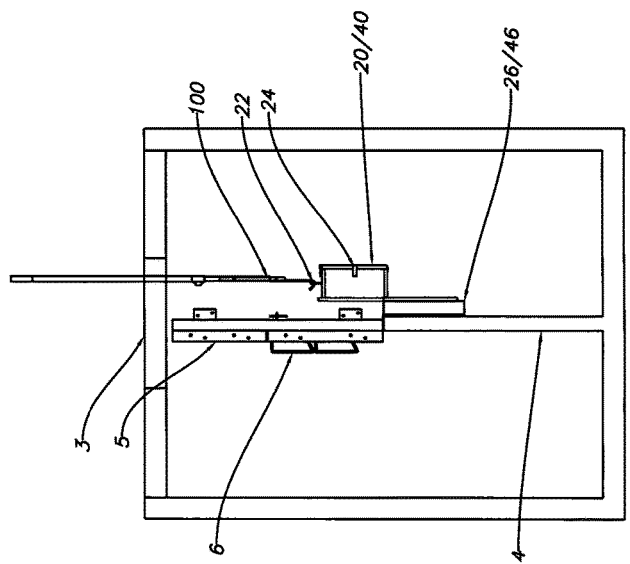
FIG. 21 is another view of the last stage of the stormwater pollution prevention system with media/polymer cartridges being removed of FIGS. 9 and 10.
Figure 22:
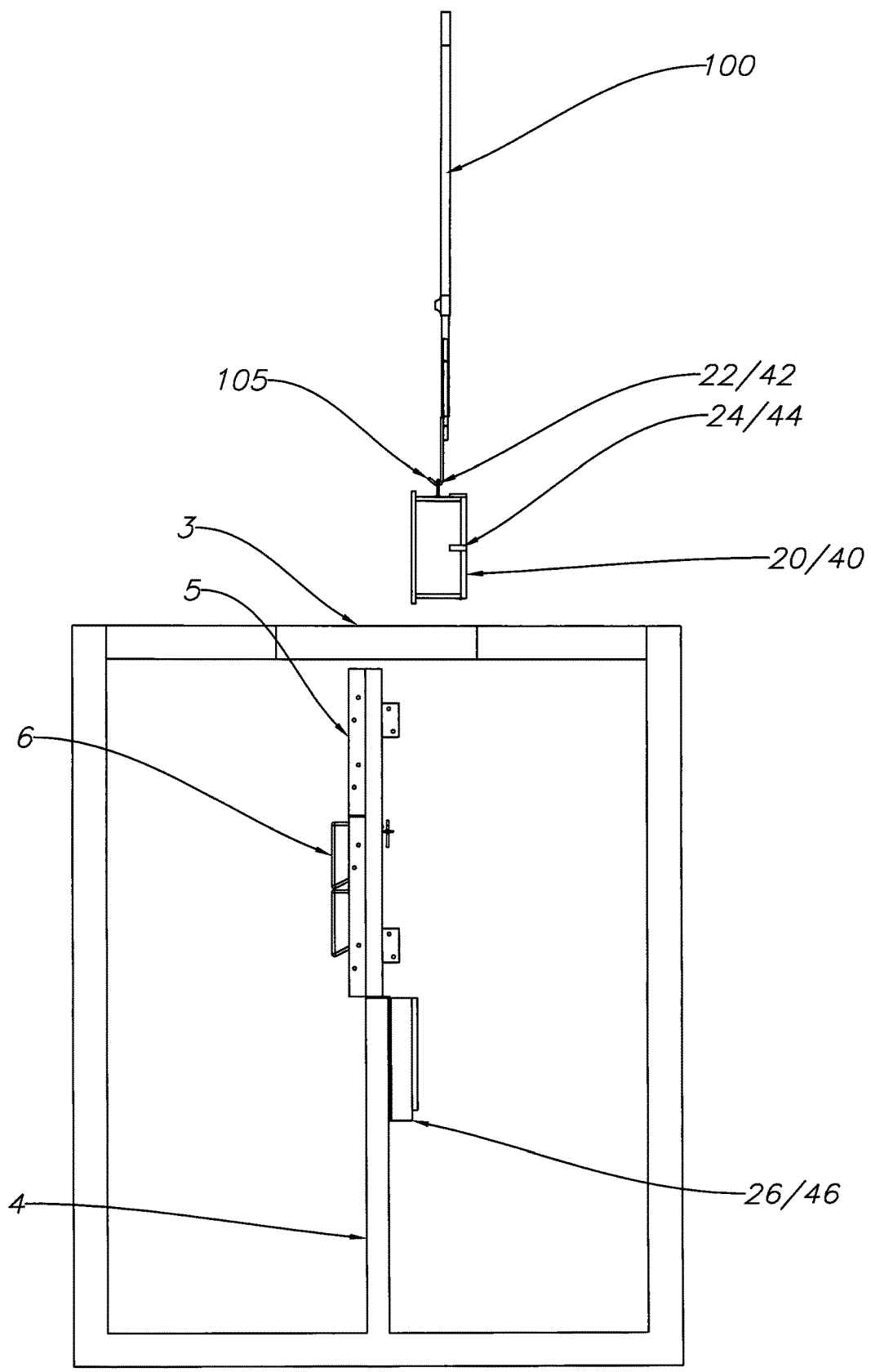
FIG. 22 is another side view of the last stage of the stormwater pollution prevention system of FIG. 21 with media/polymer cartridge being removed by a servicing tool.

FIG. 19 is a top view of the last stage of the stormwater pollution prevention system 1/30 of FIGS. 1 and 5, showing the baffle wall 4 with the plurality of horizontal media cartridges 20/polymer cartridges 40 thereon. FIG. 20 is a right side view of the last stage of the stormwater pollution prevention system 1/30 of FIG. 19. FIG. 21 is another view of the last stage of the stormwater pollution prevention system 1/30 with media/polymer cartridges 20/40 being removed of FIGS. 9 and 10. FIG. 22 is another side view of the last stage of the stormwater pollution prevention system 1/30 of FIG. 21 with media/polymer cartridge 20/40 being removed by a servicing tool 100.

Referring to FIGS. 19-20, an elongated servicing tool 100 having a hook bottom 105 can be passed through an access point 3 by a person servicing the vault/box 2. The hook end 105 can be used to hook onto the handle(s) 22, 42 of each of the cartridges 20, 40. Pulling upward on the servicing tool 100 allows the outer side edges of each of the cartridges 20, 40 slides out of the parallel tracks 26, 46 so as to service the inside media 23/polymer logs 43 inside of the cartridges 20/40.

Single Media Cartridge

Figure 23:
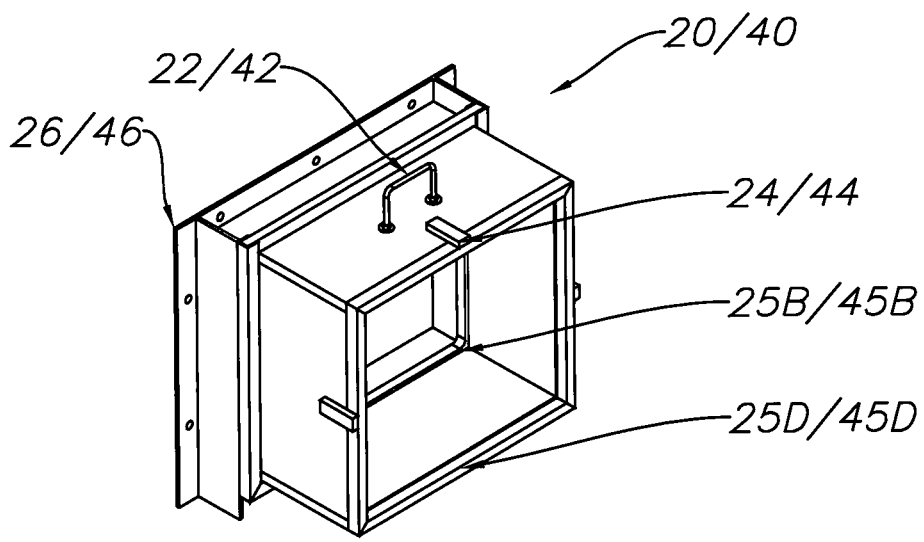
FIG. 23 is an enlarged rear perspective view of a media/polymer cartridge mounted in a cartridge track of the preceding FIGURES.
Figure 24:
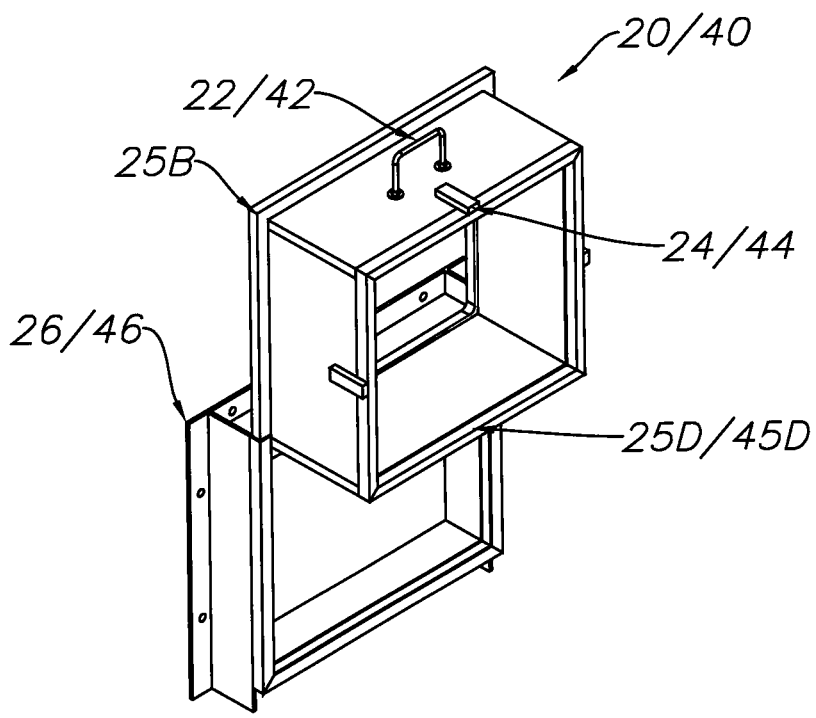
FIG. 24 is another perspective view of the media/polymer cartridge partially removed from the cartridge track in FIG. 24.

FIG. 23 is an enlarged rear perspective view of a media/polymer cartridge 20/40 mounted in a cartridge tracks 26/46 of the preceding FIGURES. FIG. 24 is another perspective view of the media/polymer cartridge 20/40 partially removed from the cartridge tracks 26/46 in FIG. 24.

Figure 25:
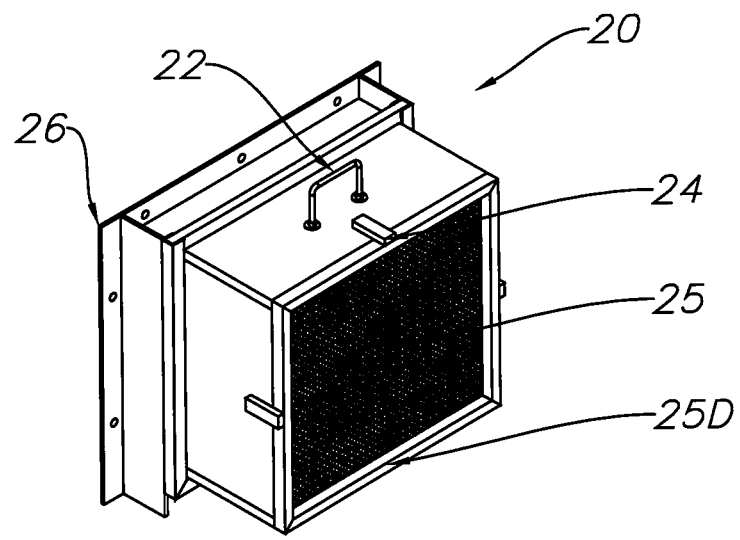
FIG. 25 is another enlarged perspective view of the media cartridge box in track of the preceding FIGURES with a screen to hold the media inside.

FIG. 25 is another enlarged perspective view of the media cartridge of the preceding FIGURES with a screen 25 to hold the media 23 inside. The type of media 23 that can be used includes the media shown and described in U.S. patent application Ser. No. 15/658,864 filed Jul. 25, 2017 to Happel, which is the same inventor as in the subject patent application and is incorporated by reference in its' entirety.

Figure 27:
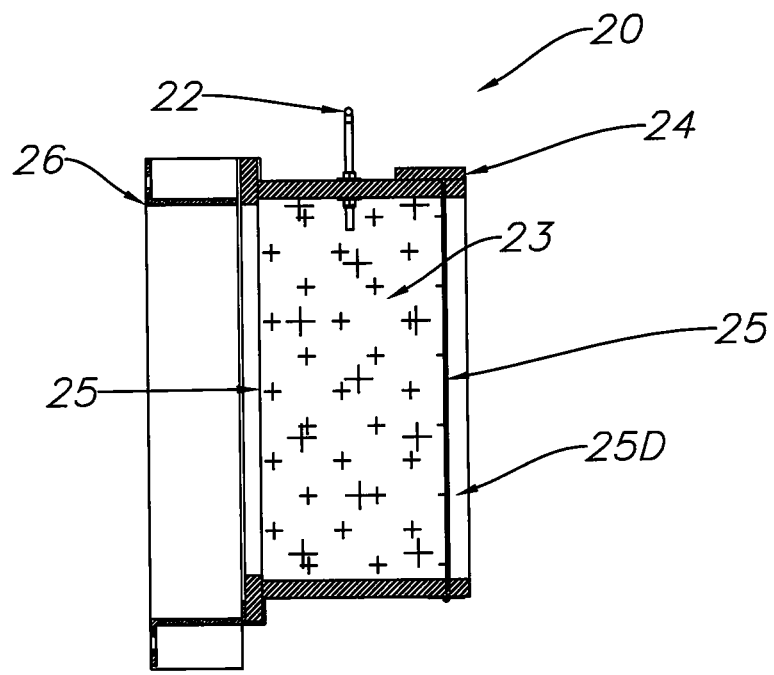
FIG. 27 is a side cross-sectional view of the media cartridge in track of FIG. 25.

FIG. 27 is a side cross-sectional view of the media cartridge 20 in the tracks 26 of FIG. 25.

Referring to FIGS. 23-25 and 27, the media cartridge 20 can have a rear side with outer extending edges that can slide within a pair of parallel facing grooves that form tracks 46 for supporting the cartridges 20. A front screen 25 can be supported within a door frame 25D and held in place by a cartridge lock(s) 24. A back screen 25 can be similarly held in place by a screened backing 25B.

Referring to FIGS. 20-25 and 27, the type of filtration media 23 that can be used can vary depending on the pollutants of concern. Over time the filtration media will become used up or saturated and will need to be serviced.

The filter cartridges 20 can be positioned along the downstream side of the fixed baffle and adjacent to the top of the fixed baffle. The purpose of the filter cartridges 20 is to provide treatment to the water flowing through the openings in the baffle 4. One or more cartridges 20 can be utilized. The cartridges 20 can be adequately sized so that they can be removed from the vault 2 through an access portal 3 at the top of the vault 2.

The filter cartridges 20 can be inserted into a frame system that is attached to the fixed baffle. The frame system will have tracks 26 in which the filter cartridges 20 will slide into. The tracks 26 for the frame system can be positioned so that the top of the baffle 4 and hydro-variant skimmer do not interfere with inserting and removing the filter cartridges 20.

There are a several advantages gained by being able to remove the filtration cartridges. To begin with, having cartridges 20 that are removable avoid the safety concerns and the complications of confined space entry protocols. Inside the vault it is relatively dirty and dark. There is a safety issue tied with the act of sending a service technician into the vault to do service work.

When service personnel enter a stormwater treatment vault 2 the issue of working in a confined space complicates the process for performing the service work. OSHA has a strict protocol for confined space entry that is time consuming and labor intensive. In addition, personnel that enter into a confined space must be pre-certified to do so and they must have the required specialized equipment to do so. Not every service technician can be permitted to enter a vault 2 to do service work.

Being able to remove the media cartridges 20 and perform servicing or the cartridges 20 outside, perhaps on a platform designed to service cartridges 20, will be much more comfortable for a service technician. Recycling the cartridges 20 outside the vault in a well lit environment will enable the servicing to be performed quickly and with better quality control.

Finally, because the filtration cartridges 20 are removable, rather than recycling the cartridges 20 in the field, the cartridges 20 can be replaced with different cartridges 20 with fresh filtration media 23. The replaced cartridges 20 can be either recycled back at a home base service facility, or disposed of and replaced with brand new cartridges 20. As a general rule, field work is more time consuming and difficult than work performed at a non-field site. Being able to replace the cartridges 20 in the field rather than service them in the field will save time and money.

One method of placing filtration media 23 in the cartridge 20 is to have a screen 25 that is adequately sized along both the upstream and downstream sides of the cartridge 20. The cartridge 20 can be filled with the filtration media 23 and the screen 25 will keep the filtration media contained within the cartridge 20 while allowing water flow to pass through the cartridge 20.

Another method used to place media 23 within the cartridge 20 is to have the booms filled with filtration media 23 placed inside the cartridge 20. The covering of the media filled booms will be sized such that the filtration media 23 cannot escape the boom and water flow can pass through the boom. The booms can be arraigned in the cartridge 20 to optimize the available space. The ends of the booms can be attached to the inside of the cartridge 20 to keep them in place.

Yet another method that can be used to place media 23 within the cartridge 20 is to have the booms filled with filtration media 23 placed inside the cartridge 20. The covering of the media filled booms will be sized such that the filtration media 23 cannot escape the boom and water flow can pass through the boom. This method keeps the booms contained within the cartridge by a screen that is adequately sized along both the upstream side and downstream sides of the cartridge 20. The cartridge 20 can be filled with booms and the screens 25 will prevent the booms from escaping the cartridge.

Single Polymer Cartridge

Figure 26:
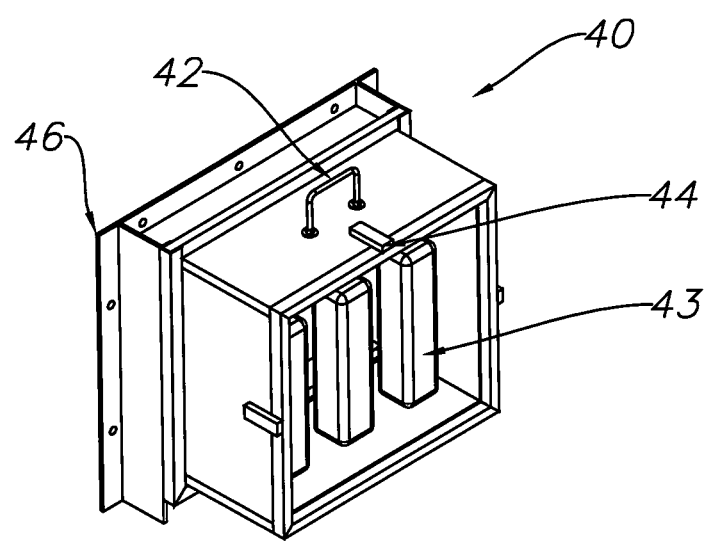
FIG. 26 is an enlarged perspective view of a polymer cartridge mounted in track of the preceding FIGURES.

FIG. 26 is an enlarged perspective view of a polymer cartridge 40 mounted in tracks of the preceding FIGURES showing polymer logs 43 vertically oriented and spaced apart from one another inside of the cartridge 40. The type of polymer logs 43 that can be used includes the polymer logs shown and described in U.S. patent application Ser. No. 15/686,931 filed Aug. 25, 2017 to Happel, which is the same inventor as in the subject patent application and is incorporated by reference in its' entirety.

Figure 28:
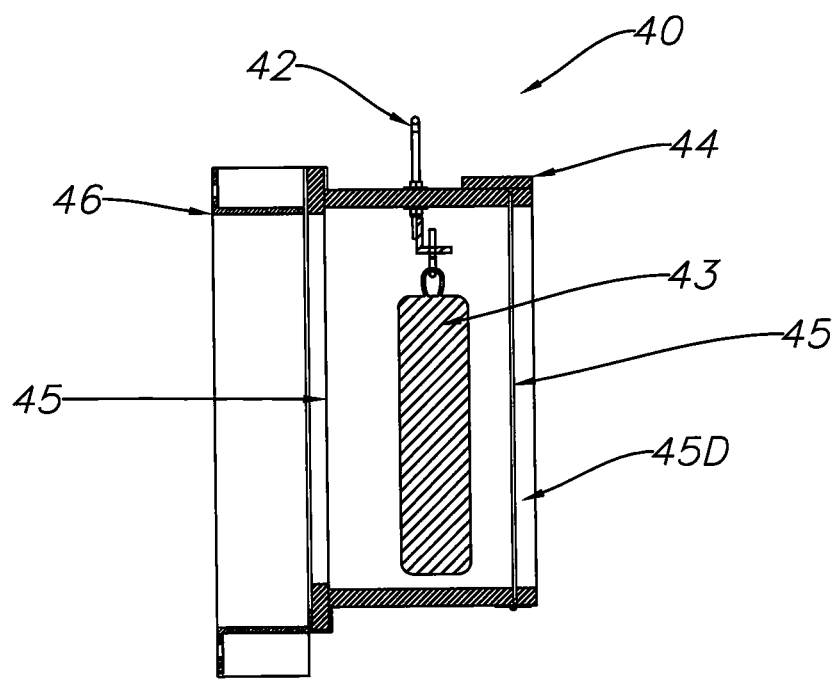
FIG. 28 is a side cross-sectional view of the polymer cartridge in track of FIG. 26 with a screen door.

FIG. 28 is a side cross-sectional view of the polymer cartridge 40 in tracks 46 of FIG. 26 with a screen door 45D.

Referring to FIGS. 23, 24, 26 and 28, the polymer cartridge 40 can include identical screens 45, screen locks 44, screen backing 45B, screen door 45D that function similarly to those previously described.

Referring to FIGS. 19-24, 26 and 28, the type of polymer material 43 used in the cartridges 40 are solid and are commonly available in logs, chunks, and particulate. The chemical makes up of the polymer will vary depending on the pollutants of concern and the properties of the water. Over time the polymer material will dissolve and/or become saturated and will need to be serviced.

The polymer cartridges 40 can be positioned along the downstream side of the fixed baffle 4 and adjacent to the top of the fixed baffle 4. The purpose of the polymer cartridges 40 is to provide treatment to the water flowing through the openings in the baffle 4. One or more cartridges 40 can be utilized. The cartridges 40 can be adequately sized so that they can be removed from the vault through an access portal 3 at the top of the vault.

The polymer cartridges 40 can be inserted into a frame system that is attached to the fixed baffle 4. The frame system can have tracks 46 in which the polymer cartridges 40 will slide into. The tracks 46 for the frame system are positioned so that the top of the baffle 4 and hydro-variant skimmer do not interfere with inserting and removing the polymer cartridges 40.

There are a several advantages gained by being able to remove the polymer cartridges 40. To begin with, having cartridges that are removable avoid the safety concerns and the complications of confined space entry protocols. Inside the vault it is relatively dirty and dark.

There is a safety issue tied with the act of sending a service technician into the vault 2 to do service work. When service personnel enter a stormwater treatment vault 2 the issue of working in a confined space complicates the process for performing the service work. OSHA has a strict protocol for confined space entry that is time consuming and labor intensive. In addition, personnel that enter into a confined space must be pre-certified to do so and they must have the required specialized equipment to do so. Not every service technician can be permitted to enter a vault 2 to do service work.

Being able to remove the polymer cartridges 40 and perform servicing or the cartridges 40 outside, perhaps on a platform designed to service cartridges 40, will be much more comfortable for a service technician. Recycling the cartridges 40 outside the vault 2 in a well lit environment will enable the servicing to be per formed quickly and with better quality control.

Finally, because the polymer cartridges 40 are removable, rather than recycling the cartridges in the field, the cartridges 40 can be replaced with different cartridges 40 with fresh polymer 43. The replaced cartridges 40 can be either recycled back at a home base service facility, or disposed of and replaced with brand new cartridges 40. As a general rule, field work is more time consuming and difficult than work performed at a non-field site. Being able to replace the cartridges 40 in the field rather than service them in the field will save time and money.

One method of placing polymers 43 in the cartridge 40 is to have a screen 45 that is adequately sized along both the upstream and downstream sides of the cartridge 40. The cartridge 40 can be filled with the polymers 43 and the screen 45 can keep the polymers contained within the cartridge while allowing water flow to pass through the cartridge 40.

Another method used to place polymer material 43 within the cartridge 40 is to have booms filled with polymers 43 placed inside the cartridge 40. The covering of the polymers filled booms can be sized such that the polymer material 43 cannot escape the boom and water flow can pass through the boom. The booms can be arraigned in the cartridge 40 to optimize the available space. The ends of the booms can be attached to the inside of the cartridge 40 to keep them in place.

Yet another method that can be used to place polymer material 43 within the cartridge 40 is to have the booms filled with polymer material 43 placed inside the cartridge 40. The covering of the polymer filled booms will be sized such that the polymer material 43 cannot escape the boom and water flow can pass through the boom. This method keeps the booms contained within the cartridge by having a screen that is adequately sized along both the upstream and downstream sides of the cartridge. The cartridge 40 can be filled with polymer filled booms and the screens 45 will prevent the booms from escaping the cartridge 40.

Referring to FIG. 28, the polymer log 43 can be hung at its' upper end. A mesh type tube/sock forming a boom can be hung with the polymer log inside the mesh type tube/sock.

Alternatively, the mesh type tube/sock can house the loose treatment media previously described. While FIG. 28 shows the mesh tube supported at its' upper end, the mesh tube/sock can also be supported at the upper end and the lower end. When loose treatment media used, the mesh tube/sock can also be tied at both the upper end and the lower end and held in place at both the upper end and the lower end.

With the mesh tube/sock, the screens 25/45 do not have to be used the hanging polymer log 43

Settling Chamber Servicing System and Procedure

A critical element for any stormwater treatment system is being able to service the system quickly and easily. The longer it takes to service a stormwater treatment system, the more money it will cost for both manpower and service equipment. In addition, there is an element of servicing that is centered around the safety of the service technicians.

For a service technician to enter a stormwater treatment vault, OSHA requires the service technicians to adhere to protocol referred to as the confined space protocol. The protocol requires the service technician that enters the vault to be equipped with a significant amount of specialized equipment. The confined space protocol also requires more personnel to be involved in the process, and a detailed report that a confined space entry took place must be submitted to an administrator. If the service technicians can complete the servicing without having to enter the vault, the additional manpower and time spent can be avoided.

Hydro-Slide System

Figure 29:
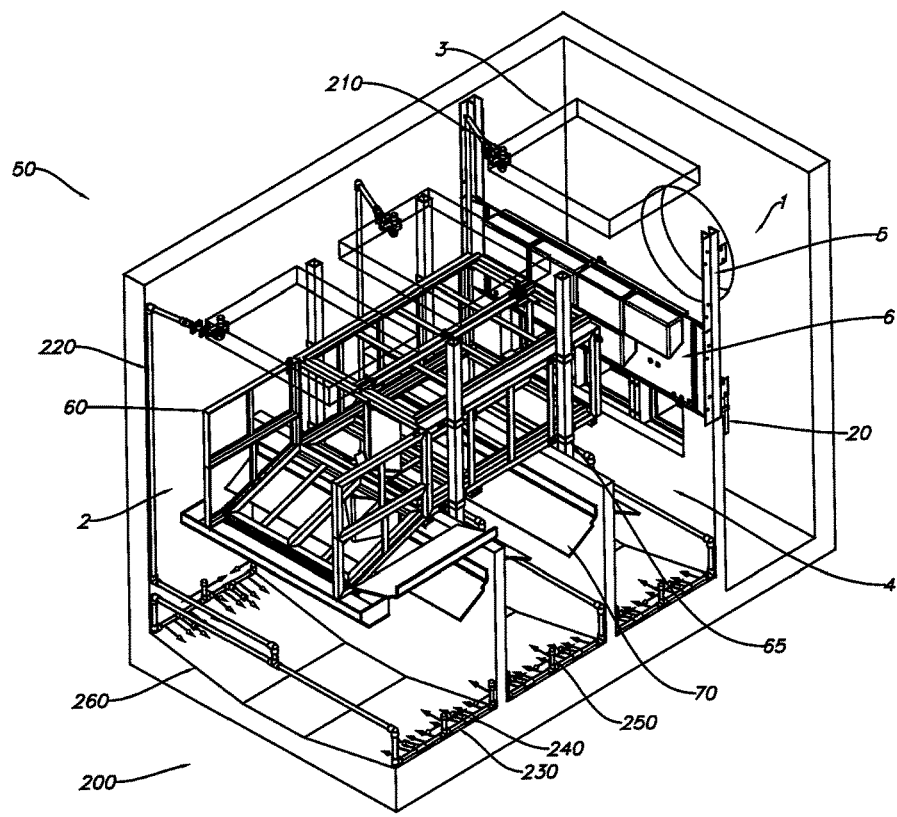
FIG. 29 is an upper front right perspective view of an entire stormwater pollution prevention system with media cartridges and cartridge track of FIG. 11 with a hydro-slide system.
Figure 30:
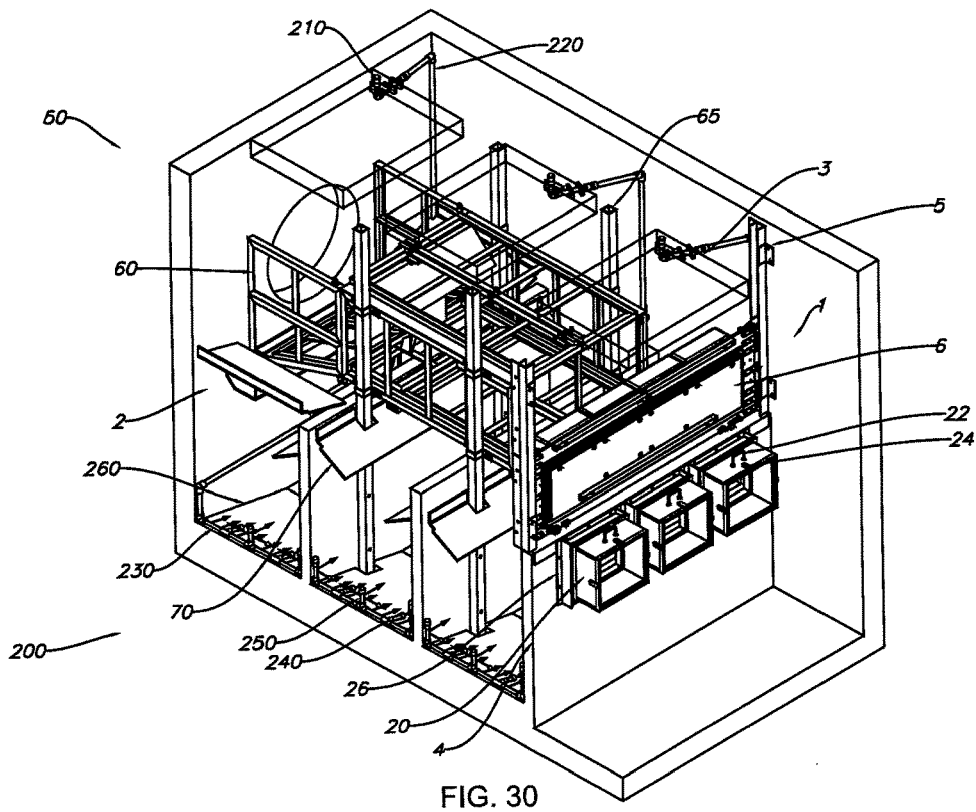
FIG. 30 is an upper rear left perspective view of the stormwater pollution prevention system with hydro-slide system of FIG. 29.
Figure 31:
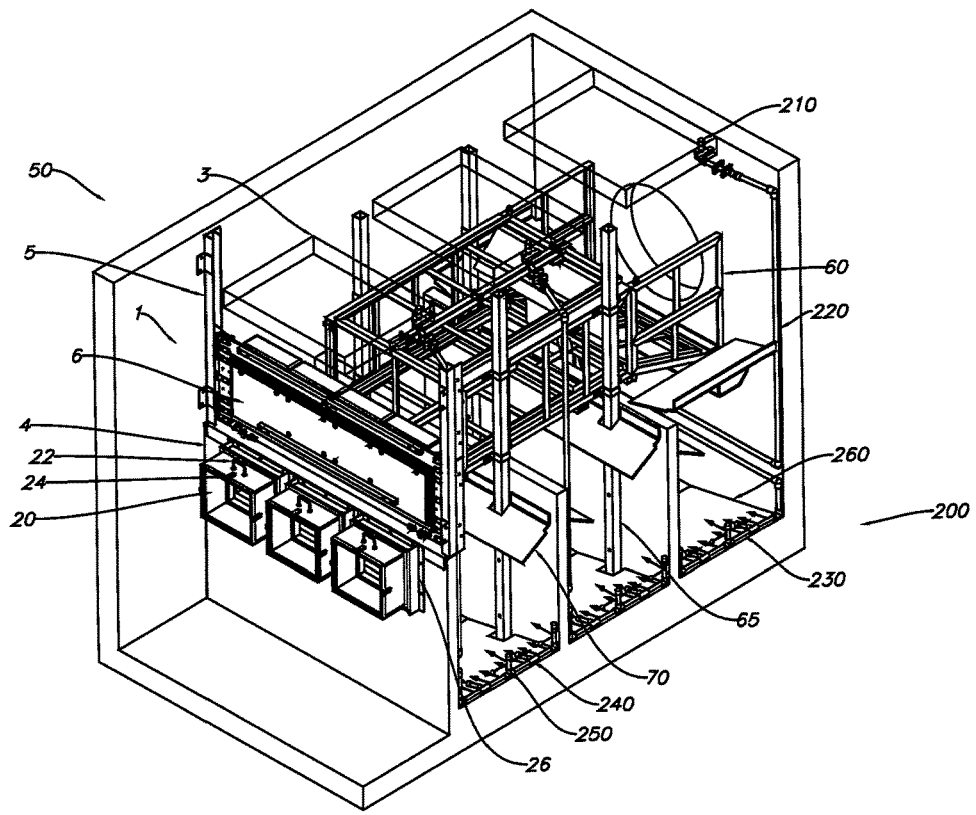
FIG. 31 is an upper rear right perspective view of the stormwater pollution prevention system with hydro-slide system of FIG. 29.
Figure 32:
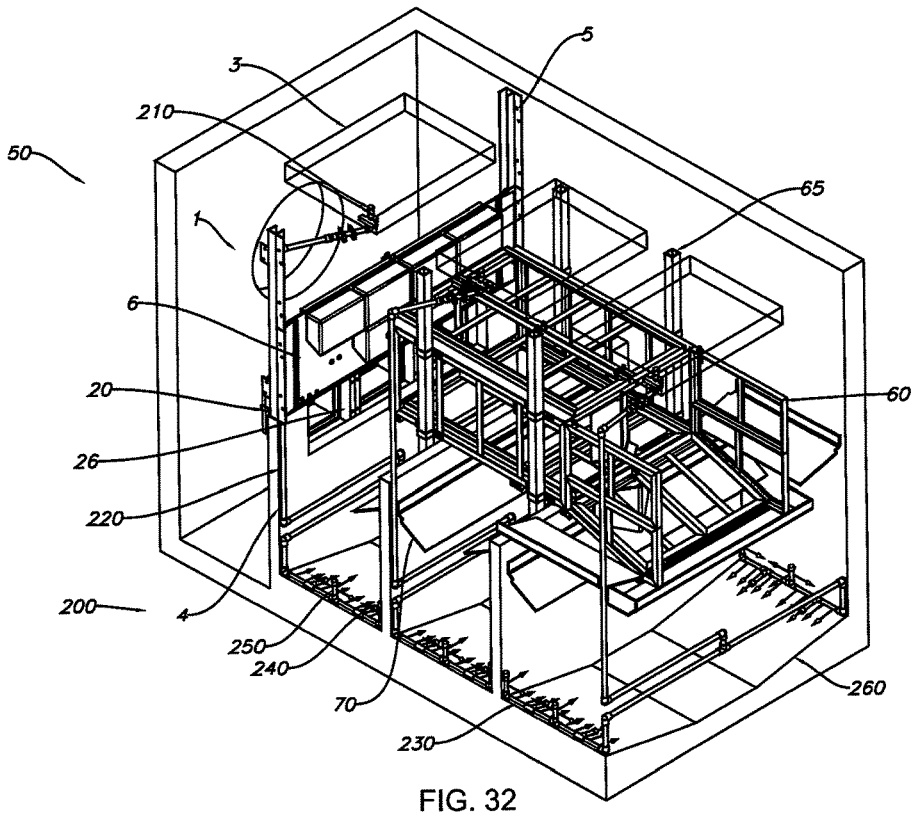
FIG. 32 is an upper front left perspective view of the stormwater pollution prevention system with hydro-slide system of FIG. 29.

FIG. 29 is an upper front right perspective view of an entire stormwater pollution prevention system 50 with cartridge system 1 with media cartridges 20 and cartridge tracks 26 of FIG. 11 with a hydro-slide system 200. FIG. 30 is an upper rear left perspective view of the stormwater pollution prevention system 50 with hydro-slide system 200 of FIG. 29. FIG. 31 is an upper rear right perspective view of the stormwater pollution prevention system 50 with hydro-slide system 200 of FIG. 29. FIG. 32 is an upper front left perspective view of the stormwater pollution prevention system 50 with hydro-slide system 100 of FIG. 29.

Referring to FIGS. 29-32, the hydroslide system 200 can include a water connection from outside of the vault/box 2 that feeds pressurized water through water line(s) 220 to spray bars 230 along the corner of where the side walls meet the side edges of the sloped floor 260 and with spray levers 240 and spray knifes 250. The components in the hydroslide system 200 are described and shown in U.S. patent application Ser. No. 15/658,864 filed Jul. 25, 2017 to Happel; U.S. patent application Ser. No. 15/686,931 filed Aug. 25, 2017 to Happel; U.S. patent application Ser. No. 15/639,685 filed Jun. 30, 2017, to Happel, which are all incorporated by reference in their entireties.

Figure 33:
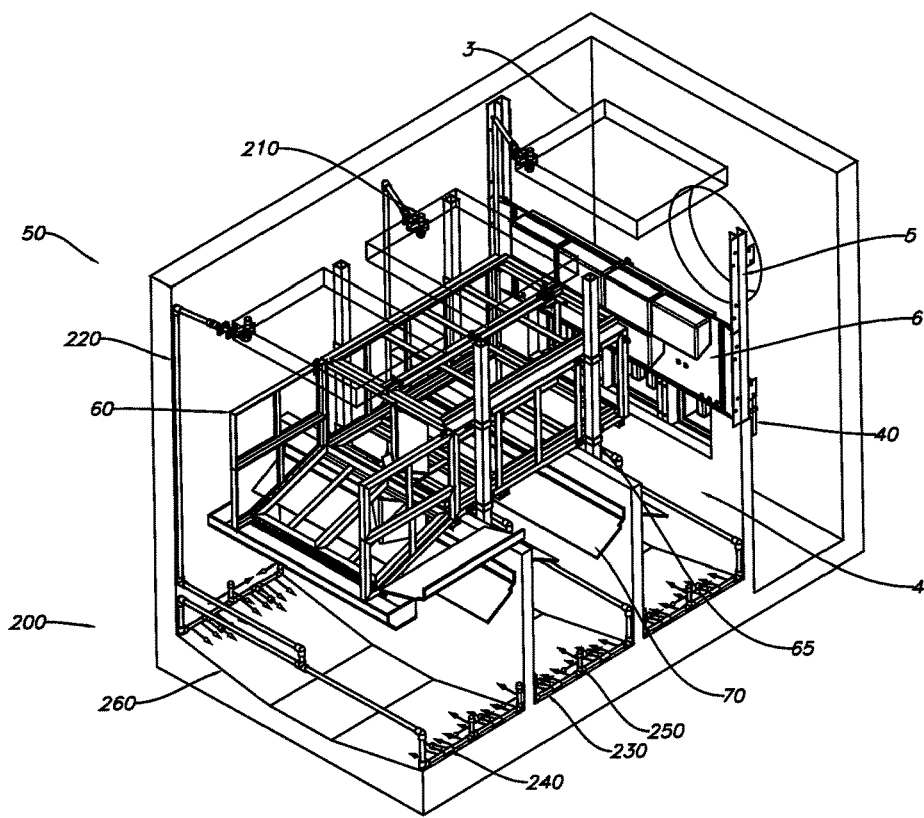
FIG. 33 is an upper front right perspective view of the stormwater pollution prevention system with polymer cartridges and cartridge track of FIG. 15 with a hydro-slide system.
Figure 34:
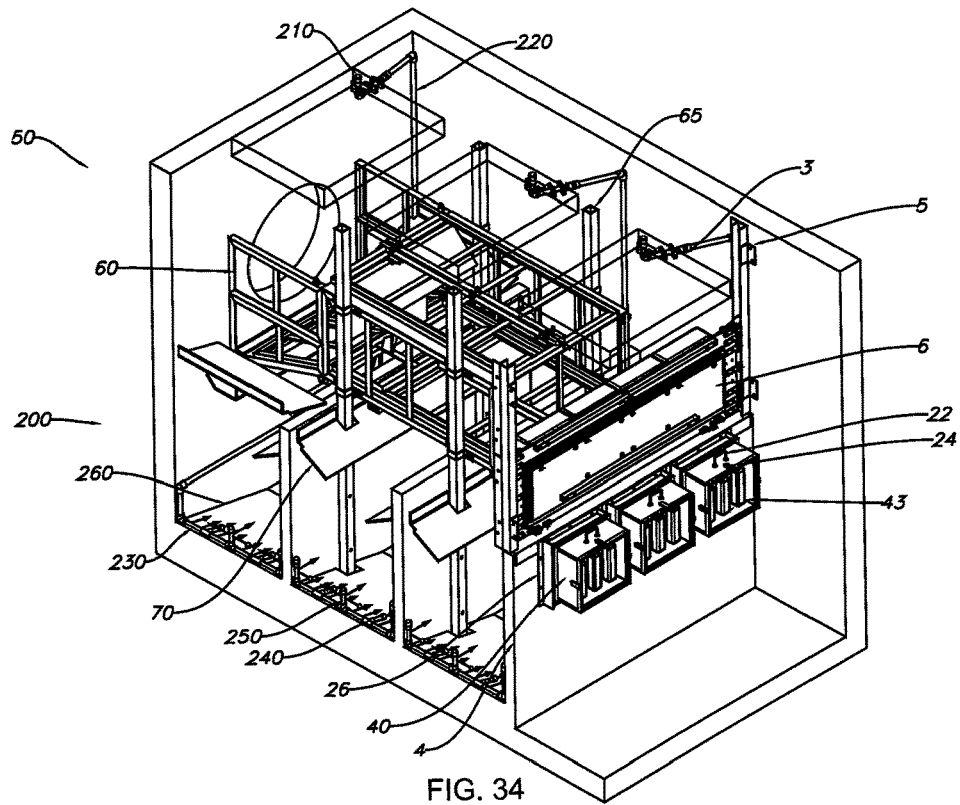
FIG. 34 is an upper rear left perspective view of the stormwater pollution prevention system with hydro-slide system of FIG. 33.
Figure 35:
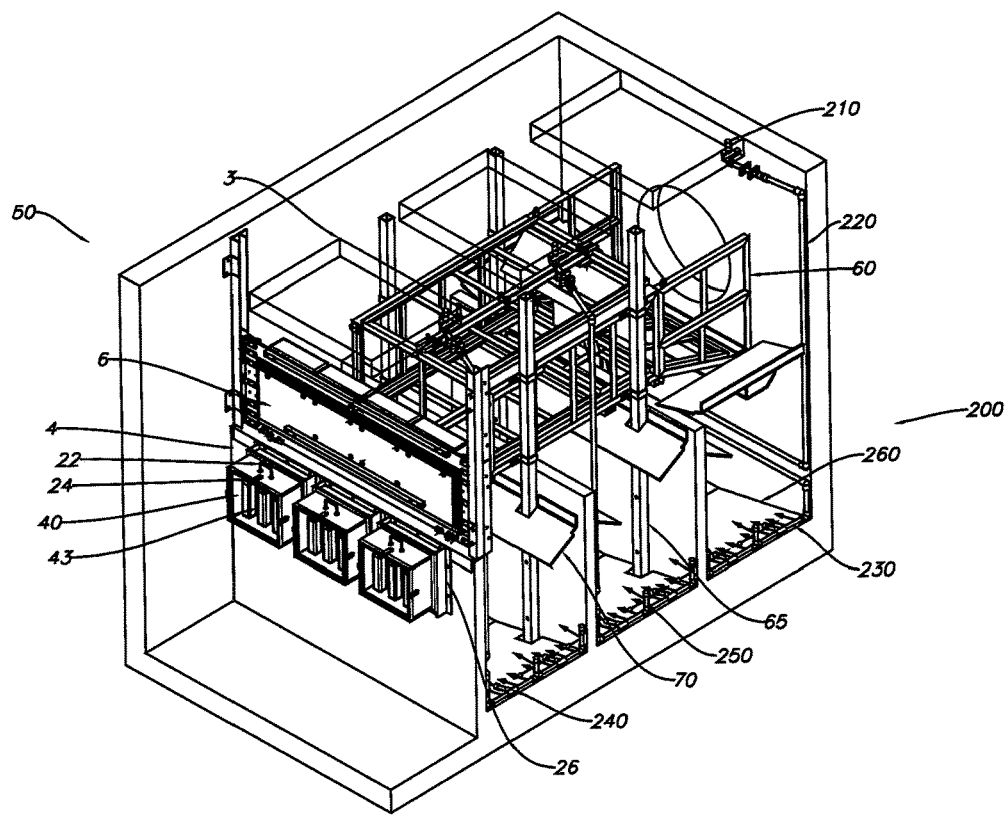
FIG. 35 is an upper front left perspective view of the stormwater pollution prevention system with hydro-slide system of FIG. 33.
Figure 36:
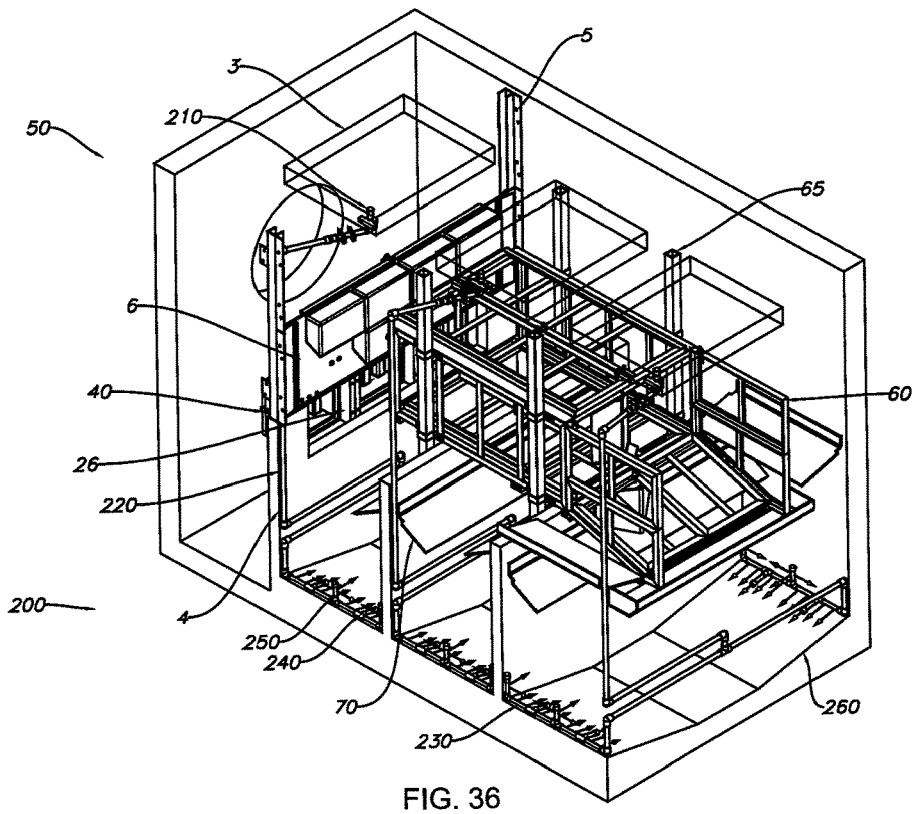
FIG. 36 is an upper front left view of the pollution prevention system of FIG. 33.

FIG. 33 is an upper front right perspective view of the stormwater pollution prevention system 50 with using the polymer system 30 with polymer cartridges 40 and cartridge track 46 of FIG. 15 with a hydro-slide system 200. FIG. 34 is an upper rear left perspective view of the stormwater pollution prevention system 50 with hydro-slide system 200 of FIG. 33. FIG. 35 is an upper front left perspective view of the stormwater pollution prevention system 50 with hydro-slide system 200 of FIG. 33.

Referring to FIGS. 33-35, the hydroslide system 200 can include a water connection from outside of the vault/box 2 that feeds pressurized water through water line(s) 220 to spray bars 230 along the corner of where the side walls meet the side edges of the sloped floor 260 and with spray levers 240 and spray knifes 250. The components in the hydroslide system 200 are described and shown in U.S. patent application Ser. No. 15/658,864 filed Jul. 25, 2017 to Happel; U.S. patent application Ser. No. 15/686,931 filed Aug. 25, 2017 to Happel; U.S. patent application Ser. No. 15/639,685 filed Jun. 30, 2017, to Happel, which are all incorporated by reference in their entireties.

Spray Bars
(Part of Settling Chamber Servicing System)

Referring to FIGS. 29-36, the servicing system for removing debris that has settled into the lower settling zone includes a spray system 200 and sloped floors 260. The spray system 200 enables water to be injected into the stormwater treatment system 50 at high pressure from outside the vault 2.

Adjacent to the access opening 3 in the top of the stormwater treatment system 50 can be an attachment fitting 210 for a vacuum service truck to connect onto. A pipe or hose will convey high pressure water flow from the service truck to the spray system 200 in the lower settling chamber. As a part of the spray system 200, spray bars 230 along the floor and vertical walls of the treatment system 50 can have water nozzles along the length of the spray bar or bars 230 that are aimed parallel with the floor 260. These nozzles operate at high pressure and will drill into the layer of solids that have settled into the settling zone adjacent to the floor 260 inside the vault 2.

The Layer of Solids Will be Liquefied from the Underside and Flushed Toward the center of the settling zone where a vacuum from a service vehicle can remove the solids from the vault.

Knife
(Part of Settling Chamber Servicing System)

Referring to FIGS. 29-36, in addition to the spray bars 230 of the spray system 200 are vertical pipe sections 250 that function as a kind of knife. The knife 250 will slice a vertical cut through the layer of solids in the settling zone of the stormwater treatment system.

As debris accumulates in a settling chamber it can become highly compacted. In addition, sediment, leaves, and twigs will become integrated throughout the accumulated debris. The presence of leaves and twigs enhances the general structure of the accumulated debris.

During servicing of the lower settling chambers when the HydroSlide service system 200 is powered on, what often happens to the collected debris are the jets that are aimed along the floor of the chamber will undermine the sediment without the majority of sediment collapsing to the floor.

Essentially, what has happened is the structure of the sediment has allowed the jets aimed along the floor 260 to drill through the sediment close to the floor, while the compacted debris above the floor jets bridges between the solid walls of the vault 2 to support the bulk of the debris above the floor jets. When debris bridging occurs the floor, jets are not able to engage all the debris.

The knife section 250 of the sprayer system 200 is typically positioned approximately midway between 2 walls within the settling chamber. The knife 250 can be a vertical high pressure spray bar having jets aimed horizontally across toward the center of the settling chamber. When the servicing system 200 is powered on the knife 230 will cut a vertical slice through the collected debris. This vertical slice through the debris will work in conjunction with the floor spray bars 230 to cause the structure of the debris to weaken. The floor spray bars 230 will work to undermine and liquefy the debris from underneath while the knife spray bar slices a vertical cut across the approximate center of the debris.

Once the slice from the knife spray bar 250 is adequately complete, the structure within the debris will fail causing the debris to collapse to the floor 260 of the vault 2. Once the potential for the debris to bridge between the walls of the vault is nullified the floor spray bars 230 will be fully able to liquefy the debris from the underside and flush all the debris toward the point in the chamber where it can be vacuumed out.

Aiming Levers 240
(Part of Settling Chamber Servicing System)

Referring to FIGS. 29-36, one of the primary objectives of the HydroSlide serving system 200 is to liquefy the sediment from underneath and thrust the debris toward the location in the settling chamber where it can be vacuumed out by a vacuum truck. This is accomplished by using water pumped into the servicing system 200 at high pressure from equipment located outside the vault 2.

Spray bars 230 having a series of nozzles are positioned along the floor of the settling chamber. The water exiting the spray nozzles needs to be traveling at a sufficient velocity so that it can drill into the debris that has settled into the settling chamber. It is also important the nozzles be aimed parallel with the floor of the settling chamber.

If the nozzles of floor spray bars 230 are not aimed parallel with the floor performance deficiencies can occur. If the nozzles are aimed too far upward the water jets will miss much the debris along the floor of the settling chamber. If the nozzles are not able to engage the sediment along the floor 260 it will not be able to thrust this debris toward the location in the settling chamber where it can be vacuumed out. If the nozzles are aimed too low the water jets will hit onto the floor of the settling chamber. When the water jets hit onto the floor the velocity of the water jets are significantly reduced and the water jets will not be able to adequately drill into the debris.

A part of the sprayer servicing system are the sloped floors which aid in conveying debris toward the location in the settling chamber where it can be vacuumed out. A difficulty to overcome is that the angle of the sloped floors vary significantly due to differences in designs and workmanship. The time that it takes to install the sprayer service system needs to be minimized to avoid added expenses. For example; during a typical installation of a stormwater treatment system a lot of heavy equipment and manpower is required, and the time to install treatment system can be very expensive. Having to take extra time to assure that the nozzles of a spray bar are aimed correctly can create delays along with the extra costs associated with these delays.

Another issue of installation of the sprayer service system can be the skill level of the installation personnel. Having a feature of the service system that reduces the required skill level to install the servicing system correctly will aid with ensuring that all installs are done perfectly correct.

The aiming levers 240 are a part of the floor spray bars 230 and will solve the before mentioned issues. The aiming levers 240 are parallel with the direction of the water jets along the spray bars 230. The aiming lever 240 serves as physical and visual indicator that ensures that the nozzles are aimed parallel with the floor of the settling chamber.

During the manufacturing of the spray bars 230 there is a high level of quality control to ensure that the aiming levers 240 are parallel with the nozzles along the spray bars 230. The technician installing the spray bars 230 simply needs to make sure the aiming lever 240 is pressed flat onto the floor 260. This can be accomplished by pushing down on the aiming lever 240 until it hits onto the floor 260. Regardless of the angle of the floor 260, when the aiming lever 240 is pressed down onto the floor the nozzles will be parallel with the floor 260. Because the process is so simple and quick, installation time and the required skill to install is minimized.

Sloped Floors
(Part of Settling Chamber Servicing System)

Referring to FIGS. 29-36, the floors 260 of the stormwater treatment system will be sloped downward and away from the wall or walls of the vault 2. Sloping the floors 260 will enable gravity to influence the movement of water and solids toward the center of the settling zone where a vacuum will remove the solids from the vault 2. Both gravity and the kinetic energy of the water nozzles will direct solids toward the center of the settling zone.

The Applicant's prior patented technologies that are similar in application to the invention. The following is comparisons of these technologies when compared to the invention herein.

When the invention is compared to U.S. Pat. No. 8,083,937 to Happel, which is incorporated by reference the following lists the problems solved and the advantages of the invention:

1. Because media filtration has the potential to blind and flow no water, the hydraulics of a treatment system is based on the potential conveyance of its bypass conveyance. The conveyance under the bypass floating skimmer is limited to the space not used by the media filter and may cause the hydraulic gradeline to stage up to an undesirable elevation during peak flows.

In the subject application, the floating skimmer spans the entire width of the vault and will have 2 to 3 times the cross-sectional bypass conveyance under the floating skimmer. The greater bypass provided by this application will significantly enhance the ability of the treatment system to not compromise the hydrology of the upstream watershed.

2. The removable media cartridge is mostly positioned above the static water line within the vault. Polymers and many types of media will perform much better when submerged under water continuously. The biofilm that develops on media when the media is wet can be an important part of the treatment process and will die when left exposed to the air for an extended period of time. Polymers will dry out and not function when exposed to the air for an extended period of time.

In the subject application, the media cartridges of the invention are sized and positioned so that they are below the static water line. Because the media and/or polymers will be continuously submerged they will perform optimally throughout the duration of their lifecycle.

3. Because of hydraulic considerations, the media cartridge is limited to a length that spans less than half the wide to the vault. The level of treatment provided by media is proportional to the amount of media used in U.S. Pat. No. 8,083,937 to Happel, which is incorporated by reference in its entirety. Using more media will provide a higher level of treatment.

In the subject application, the media cartridges 20/40 can span the entire width of the vault for approximately double the volume of media being applied for treatment.

4. Because the bottom media cartridge is approximately equal to the static water level, during the beginning of every flow only the media adjacent to the bottom of the cartridge will engage the water flow. As the flow rate gradually increases the water level will rise and gradually engage the media from the bottom up. The media adjacent to the top of the cartridge will only engage the water flow during higher flows. Because all the media is not engaged for all flows treatment is significantly reduced. In addition, because the media adjacent to the bottom of the cartridge receives a lot more flow than the rest of the media, it will wear out faster than desired and stop working. To keep the cartridge functioning ideally the media will need to be replaced frequently.

In the subject application, the cartridges used in the invention are continuously and fully submerged during when no water is flowing. As water begins to flow through the vault, the media within all the cartridges is fully engage with providing treatment to the water flow. Throughout all flow rates all the media in all the cartridges remains engaged with providing treatment.

When the invention is compared to Applicant's U.S. Pat. No. 8,321,780 to Happel, which is incorporated by reference in its' entirety, the following lists the problems solved and the advantages of the invention:

1. Because the floats are recessed into the body of the skimmer panel there are gravity force vectors that that act on the water that pressing the water against skimmer surface under the floats that reduces the front side buoyancy of the skimmer. The filter cartridge will have the same type of force vectors acting on the horizontal surfaces of the cartridge.

In addition, the weight of the cartridge, including the media weight and/or weight of the polymers, will have to be compensated for by adding buoyancy to the skimmer. Even if the skimmer had a flat front side (as shown in U.S. Pat. No. 8,321,780 to Happel, which is incorporated by reference in its' entirety), and the floats were attached so that the floats were fully in front of the skimmer rather than recessed into the skimmer, the cartridge could not be removable from outside the vault. In such an arrangement the floats would be above the cartridge and prevent the cartridge from moving upward to be removed.

In the subject application, because the floats across the front side of the skimmer are completely in front of the skimmer panel, there are no surfaces of the skimmer under the floats. The front side of the skimmer is a flat vertical panel with no horizontal surfaces for gravity to press water against. Because the floats are spaced off the front side of the skimmer, water is able to fully encapsulate the floats without any downward force vectors against the skimmer.

This arrangement enables maximum front side buoyancy of the skimmer to such a degree that no water needs to be present on the backside of the skimmer to make the skimmer float . . . maximum front side buoyancy. As a result, the invention requires smaller and less expensive floats to achieve the desired skimmer buoyancy. The cartridge has been placed along the back side of the fixed baffle, which is the opposite side of the skimmer from the floats. The floats along the front side of the skimmer will not interfere with the removal of the cartridges along the back side of the baffle. Hence the service technician will have easy access to the cartridges from outside the vault at finish grade. In addition, there will be no need to enter the vault to remove the cartridges which will avoid any confined space issues.

2. Because the bottom media cartridge is approximately equal to the static water level, during the beginning of every flow only the media adjacent to the bottom of the cartridge will engage the water flow. As the flow rate gradually increases the water level will rise and gradually engage the media from the bottom up. The media adjacent to the top of the cartridge will only engage the water flow during higher flows.

Because all the media is not engaged for all flows treatment is significantly reduced. In addition, because the media adjacent to the bottom of the cartridge receives a lot more flow than the rest of the media, it will wear out faster than desired and stop working. To keep the cartridge functioning ideally the media will need to be replaced frequently.

In the subject application the cartridges used in the invention are continuously and fully submerged during when no water is flowing. As water begins to flow through the vault, the media within all the cartridges is fully engage with providing treatment to the water flow. Throughout all flow rates all the media in all the cartridges remains engaged with providing treatment.

3. The removable media cartridge is mostly positioned above the static water line within the vault. Polymers and many types of media will perform much better when submerged under water continuously. The biofilm that develops on media when the media is wet can be an important part of the treatment process and will die when left exposed to the air for an extended period of time. Polymers will dry out and not function when exposed to the air for an extended period of time.

In the subject application, the media cartridges of the invention are sized and positioned so that they are below the static water line. Because the media and/or polymers will be continuously submerged they will perform optimally throughout the duration of their lifecycle.

When the subject application is compared to Applicant's U.S. Pat. No. 8,034,234, which is incorporated by reference in its' entirety, the following lists the problems solved and the advantages of the invention:

1. A horizontal upflow filter system requires more horizontal area in a vault than a vertical media cartridge. Because water is flowing upward through the filtration media system, the media system is limited in depth, and instead, require a significant horizontal area in the vault. The requirement for horizontal area to fit a horizontal media vessel or cartridge in a vault increases the cost for the vault.

On properties (in U.S. Pat. No. 8,034,234) where space is limited for the placement of a treatment system, there may not be adequate space for a vault that can accommodate a horizontal media bed.

The subject application solution will now be described. Because the media cartridges 20 are aligned vertically along a baffle within the vault, the horizontal space required to apply the invention is minimal. The horizontal space requirement is approximately 1/3 of a horizontal media system. Because the space required to install the invention in a vault is much less than a horizontal media system, the cost for the vault can be reduced, and the invention can more easily fit on properties that are limited on available space.

2. The shape and position of a horizontal media filtration system will make it difficult to remove for servicing. Because horizontal media vessels are difficult to remove, they are not removed as a part of servicing. Servicing takes place without removing the media vessels. Servicing is performed by reaching in with tools from finish grade at a distance, and/or by sending a service technician inside the vault. Either way, the lighting is not good and seeing a distance to do the work is difficult.

When a service technician enters the vault for servicing a safety protocol dealing with a confined space entry must be adhered to. Such a protocol is complicated and increases the cost for the service work.

The solution in the subject application will now be described. There is no need to enter the vault to service the cartridges. The cartridges can be easily reached from outside the vault from finish grade. Specialized servicing reach tools are provided to the service crew that enable the crew to remove the cartridges from the vault and perform maintenance as needed. The service work is performed outside the vault where the technician remains safe and can clearly see what needs to be accomplished. The service technician has the option of repopulating the removed cartridges or replacing them with new cartridges. The used cartridges can be returned to a service facility for recycling. Replacing the cartridges minimizes the amount of work required to be performed in the field which saves time and money.

Significant Innovations of the Invention

1) The hydro-variant skimmer portion of the invention enables the treatment system to have a very high level of treatment during low to medium water flow rates, without compromising the hydrology of the upstream water shed during high water flow rates. The hydraulics of the hydro-variant skimmer creates headloss and the detention of water during low to medium flow rates. During high flow rates the hydro-variant skimmer automatically adjusts to completely eliminate the headloss created during the lower water flow rates. This enables an overall high level of stormwater treatment without the potential for flooding.

2) The hydro-variant skimmer portion of the invention is especially unique because the buoyancy of the skimmer is dependent only on the HGL along the upstream side of the skimmer. The space between the floats along the upstream side of the skimmer and the upstream side of the skimmer panel enable the water to encapsulate the floats for maximum buoyancy. If these floats were not separated from the skimmer panel the skimmer would not have front side buoyancy, and dependent on a HGL on both sides of the skimmer to float.

3) The invention is such that the arrangement of the cartridges along the back side of the fixed baffle is such that the cartridges do not interfere with the hydro-variant skimmer, and the cartridges can be easily reached by a service technician from outside the vault. The floats across the top of the hydro-variant skimmer would block easy access to the cartridges if the cartridges were placed along the front side of the baffle. If the cartridges were placed within the baffle then the body (skimmer panel) of the hydrovariant skimmer would block access to the cartridges.

4) The ability of the invention to use many different types of filtration media to target a wide variety of pollutants of concern. Generally, there is not a single type of filtration media that is the best at treating all types of pollutants. Having a treatment system that can accommodate many different types of filtration media is advantageous.

5) The ability of the invention to position the filtration media below the flow line between the inflow and outflow openings of the vault. This enables the filtration media to be continuously maintained in a wet condition which enhances the effectiveness of the media. In addition, water flow that passes through the vault is channeled so that it must pass through the filtration media, all the media is engaged with providing treatment to the water flow.

6) The ability of the invention to be able to accommodate polymers to treat stormwater flow. Polymers can be adapted to the cartridges to provide chemical treatment to stormwater flow. The cartridges can be filled with polymers.

7) The invention has the ability to maintain continuously submerged polymers. Polymers will dry out over time and become less effective when exposed to the air. Because the cartridges maintain polymers continuously submerged, the polymers will never dry out, and they will perform optimally until fully dissolved. In addition, water flow that passes through the vault is channeled so that it must pass through the cartridges, and all the polymer is engaged with providing treatment to the water flow.

8) The invention has the ability to apply media filtration and polymer dosing while fitting into a space that is less than the of other treatment systems.

9) The ability of the invention to store large volumes of sediment, and then have the sediment easily and quickly removed by a specialized sediment servicing system.

10) The ability of the invention to have debris removed from lower settling chambers quickly and easily without a service technician having to enter the vault. Because the service technician does not have to enter the vault, elaborate safety protocols do not have to be performed.

11) The ability of the invention to have debris removed from the lower settling chambers quickly and easily saves time and servicing costs. The sediment servicing system has the ability to remove the debris that settles in the lower settling chambers of the invention in a fraction of time. Faster servicing saves money by reducing labor and equipment costs.

While the embodiments generally describe the cartridge with replacement treatment media and replacement polymer log(s), the cartridges can also be intended to be throw-away cartridges, if needed.

Although the embodiments show a plurality of floats on the float skimmer, the invention can be used with one elongated float generally between the opposing sides of the vault/box.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A stormwater pollution prevention system, comprising:
   a floating skimmer having a float that extends across and along a top of a panel, the panel having outer side edges being slidably mounted in tracks along opposite sides of a water treatment box, wherein the floating skimmer panel rises from adjacent to and above a top of a first baffle wall in the water treatment box;
   an opening in said first baffle wall adjacent to a static waterline and below said skimmer in the water treatment box; and
   a removable cartridge on the outlet side of the baffle opening covering an outlet side of the baffle opening, wherein the removable cartridge provides for treating pollutants passing though the opening in the baffle.

2. The stormwater pollution treatment system of claim 1, wherein the float includes: a plurality of floats extending between one side of the vault to another side of the vault.

3. The stormwater pollution treatment system of claim 1, wherein the opening in the baffle includes a plurality of horizontal openings in the baffle extending from one side of the vault to another side of the vault, and the removable cartridge includes a plurality of removable cartridges, each cartridge for covering the outlet side of the plurality of the openings in the baffle, wherein the plurality of removable cartridges provides for treating the pollutants passing though the openings in the baffle.

4. The stormwater pollution treatment system of claim 1, wherein the cartridge includes:
   a first screen covering the inlet side of the cartridge;
   a second screen covering the outlet side of the cartridge; and
   a treatment media between the first screen and the second screen, the treatment media being replaceable by when the first and second screens are removed.

5. The stormwater pollution treatment system of claim 4, wherein the removable cartridge includes:
   side edges that allow for the removable cartridge to slide up and down along tracks on both sides of the opening in the baffle.

6. The stormwater pollution treatment system of claim 5, wherein the removable cartridge includes:
   a handle on a top of the removable cartridge; and
   an elongated servicing tool with an attachment end which allows for removing the cartridge by the servicing tool, without requiring entry into the water treatment box.

7. The stormwater pollution treatment system of claim 1, wherein the cartridge includes:
   a first screen covering the inlet side of the cartridge;
   a second screen covering the outlet side of the cartridge; and
   a treatment polymer between the first screen and the second screen, the treatment media being replaceable by when the first and second screens are removed.

8. The stormwater pollution treatment system of claim 7, wherein the treatment polymer includes at least one polymer log.

9. The stormwater pollution treatment system of claim 7, wherein the removable cartridge includes:
   side edges that allow for the removable cartridge to slide up and down along tracks on both sides of the opening in the baffle.

10. The stormwater pollution treatment system of claim 9, wherein the removable cartridge includes:
    a handle on a top of the removable cartridge; and
    an elongated servicing tool with an attachment end which allows for removing the cartridge by the servicing tool, without requiring entry into the water treatment box.

11. The stormwater pollution treatment system of claim 1, further comprising:
    a screen system adjacent to an inlet to the water treatment box in front of the floating skimmer.

12. The stormwater pollution treatment system of claim 11, further comprising:

at least a second baffle in the treatment box between the inlet and the first baffle; and at least one deflector on the second baffle.

13. The stormwater pollution treatment system of claim 1, further comprising:

a sloped floor in the treatment box; and water jets along corners of the walls and the floor for moving debris along the sloped floor.

14. The stormwater pollution treatment system of claim 1, wherein the cartridge includes:

a mesh tube for housing a loose media inside.

15. The stormwater pollution treatment system of claim 1, wherein the cartridge includes:

a mesh tube for housing a polymer log inside.

16. A stormwater treatment system, comprising:

a floating skimmer with at least one float extending across a top of a vertical flat panel, the panel having outer side edges being slidably mounted in tracks along opposite sides of a water treatment box, wherein the floating skimmer panel rises from adjacent to and above a top of a baffle in the water treatment box;

at least one horizontal opening in the baffle below a static waterline and below said skimmer in the water treatment box;

a pair of parallel tracks covering each of the baffle openings on an outlet side of the baffle; and at least one removable cartridge, each cartridge sliding in each pair of the tracks, wherein the at least one removable cartridge provides for treating pollutants passing though the opening in the baffle.

17. The stormwater treatment system of claim 16, wherein each cartridge includes:

a first screen covering the inlet side of the cartridge;

a second screen covering the outlet side of the cartridge; and a treatment media between the first screen and the second screen, the treatment media being replaceable by when the first and second screens are removed.

18. The stormwater treatment system of claim 16, wherein each cartridge includes:

a first screen covering the inlet side of the cartridge;

a second screen covering the outlet side of the cartridge; and a treatment polymer between the first screen and the second screen, the treatment media being replaceable by when the first and second screens are removed.

19. The stormwater treatment system of claim 16, wherein each cartridge includes:

a mesh tube for housing a loose treatment media inside.

20. The stormwater treatment system of claim 16, wherein each cartridge includes:

a mesh tube for housing a polymer log inside.

* * * * *